United States Patent
Powell

(10) Patent No.: US 9,604,188 B2
(45) Date of Patent: Mar. 28, 2017

(54) METHODS AND SYSTEMS FOR PROMOTING HYDROGEN GAS DISTRIBUTION WITHIN CELLULOSIC BIOMASS SOLIDS DURING HYDROTHERMAL DIGESTION

(71) Applicant: Shell Oil Company, Houston, TX (US)

(72) Inventor: Joseph Broun Powell, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 583 days.

(21) Appl. No.: 14/108,968

(22) Filed: Dec. 17, 2013

(65) Prior Publication Data

US 2014/0174433 A1 Jun. 26, 2014

Related U.S. Application Data

(60) Provisional application No. 61/740,006, filed on Dec. 20, 2012.

(51) Int. Cl.
*B01J 8/00* (2006.01)
*B01J 8/02* (2006.01)
(Continued)

(52) U.S. Cl.
CPC ............. *B01J 8/005* (2013.01); *B01J 8/025* (2013.01); *B01J 8/22* (2013.01); *C10G 1/065* (2013.01);
(Continued)

(58) Field of Classification Search
CPC ..... B01J 8/005; B01J 8/025; B01J 8/22; B01J 2208/00017; B01J 2208/00938;
(Continued)

(56) References Cited

U.S. PATENT DOCUMENTS 3,495,952 A 2/1970 Ulbrecht et al.
4,312,741 A 1/1982 Jacquin
(Continued)

FOREIGN PATENT DOCUMENTS

CN 101460594 6/2009
CN 102584750 7/2012
(Continued)

OTHER PUBLICATIONS

Written Opinion of the International Searching Authority for PCT/US2013/076419, dated Jun. 25, 2014.*
(Continued)

*Primary Examiner* — David A Reifsnyder

(57) ABSTRACT

Methods and systems for promoting hydrogen gas distribution within cellulosic biomass solids during hydrothermal digestion. One exemplary method can comprise providing cellulosic biomass solids in a hydrothermal digestion unit in the presence of a digestion solvent and a slurry catalyst capable of activating molecular hydrogen; and heating the cellulosic biomass solids and the digestion solvent in the presence of molecular hydrogen, thereby forming an alcoholic component derived from the cellulosic biomass solids, at least a portion of the molecular hydrogen being introduced to the hydrothermal digestion unit via a plurality of spaced apart fluid inlets vertically disposed about the height of the hydrothermal digestion unit.

10 Claims, 7 Drawing Sheets

(51) Int. Cl.
*B01J 8/22* (2006.01)
*C10G 3/00* (2006.01)
*C10G 1/06* (2006.01)

(52) U.S. Cl.
CPC ............... *C10G 3/42* (2013.01); *C10G 3/50* (2013.01); *B01J 2208/00017* (2013.01); *B01J 2208/00752* (2013.01); *B01J 2208/00893* (2013.01); *B01J 2208/00938* (2013.01); *B01J 2219/0004* (2013.01); *C10G 2300/1014* (2013.01); *Y02P 30/20* (2015.11)

(58) Field of Classification Search
CPC .. B01J 2208/00893; C10G 1/065; C10G 3/42; C10G 3/50; C10G 2300/1014; Y02P 30/20
See application file for complete search history.

(56) References Cited

U.S. PATENT DOCUMENTS

| | | | |
|---|---|---|---|
| 5,252,613 A | 10/1993 | Chang et al. | |
| 6,030,915 A | 2/2000 | de Boer | |
| 6,127,229 A | 10/2000 | Chu et al. | |
| 9,000,245 B2 | 4/2015 | OConnor et al. | |
| 9,174,417 B2 | 11/2015 | Hoecker et al. | |
| 2010/0236988 A1 | 9/2010 | Gabrielov et al. | |
| 2011/0219670 A1* | 9/2011 | Berger | B01J 8/003 44/307 |
| 2012/0317872 A1 | 12/2012 | Powell et al. | |

FOREIGN PATENT DOCUMENTS

| | | |
|---|---|---|
| GB | 2055607 | 3/1981 |
| WO | 2009130045 | 10/2009 |
| WO | 2011141546 | 11/2011 |
| WO | 2014004844 | 1/2014 |
| WO | 2014058686 | 4/2014 |
| WO | WO 2014100350 A2 * | 6/2014 ............... B01J 8/22 |

OTHER PUBLICATIONS

International Search Report dated Jun. 25, 2014 for PCT/US2013/076419 filed Dec. 19, 2013.
State Intellectual Property Office of the People's Republic of China, Notification of the 1st Office Action for Application No. 201380071002.3 dated Mar. 14, 2016.

* cited by examiner

METHODS AND SYSTEMS FOR PROMOTING HYDROGEN GAS DISTRIBUTION WITHIN CELLULOSIC BIOMASS SOLIDS DURING HYDROTHERMAL DIGESTION

CROSS-REFERENCE TO RELATED APPLICATIONS

This non-provisional application claims the benefit of U.S. Provisional Application No. 61/740,006, filed on Dec. 20, 2012, the disclosure of which is incorporated by reference herein in its entirety.

TECHNICAL FIELD

The present disclosure generally relates to digestion of cellulosic biomass solids, and, more specifically, to methods and systems for promoting hydrogen gas distribution within cellulosic biomass solids during hydrothermal digestion.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, including biomass. Cellulosic biomass may be particularly suitable in this regard due to the versatility of the abundant carbohydrates found therein in various forms. As used herein, the term "cellulosic biomass" refers to a living or formerly living biological material that contains cellulose. The lignocellulosic material found in the cell walls of higher plants is one of the world's largest sources of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter.

Significant attention has been placed on developing fossil fuel alternatives derived from renewable resources. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have typically produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass prior to pulp formation. Although digestion processes used in connection with forming fuel blends and other materials may likewise remove lignin prior to digestion, these extra process steps may impact the energy efficiency and cost of the biomass conversion process. The presence of lignin during high-conversion cellulosic biomass digestion may be particularly problematic.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150° C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, diols, monohydric alcohols, and any combination thereof, some of which may also include a residual carbonyl functionality (e.g., an aldehyde or a ketone). Such reaction products are more thermally stable than soluble carbohydrates and may be readily transformable into fuel blends and other materials through conducting one or more downstream reforming reactions. In addition, the foregoing types of reaction products are good solvents in which a hydrothermal digestion may be performed, thereby promoting solubilization of soluble carbohydrates as their reaction products during hydrothermal digestion.

A particularly effective manner in which soluble carbohydrates may be formed and converted into more stable compounds is through conducting the hydrothermal digestion of cellulosic biomass in the presence of molecular hydrogen and a slurry catalyst capable of activating the molecular hydrogen (also referred to herein as a "hydrogen-activating catalyst"). That is, in such approaches (termed "in situ catalytic reduction reaction processes" herein), the hydrothermal digestion of cellulosic biomass and the catalytic reduction of soluble carbohydrates produced therefrom may take place in the same vessel. As used herein, the term "slurry catalyst" will refer to a catalyst comprising fluidly mobile catalyst particles that can be at least partially suspended in a fluid phase via gas flow, liquid flow, mechanical agitation, or any combination thereof. If the slurry catalyst is sufficiently well distributed in the cellulosic biomass, soluble carbohydrates formed during hydrothermal digestion may be intercepted and converted into more stable compounds before they have had an opportunity to significantly degrade, even under thermal conditions that otherwise promote their degradation. Without adequate catalyst distribution being realized, soluble carbohydrates produced by in situ catalytic reduction reaction processes may still degrade before they have had an opportunity to encounter a catalytic site and undergo a stabilizing reaction. In situ catalytic reduction reaction processes may also be particularly suitable from an energy efficiency standpoint, since hydrothermal digestion of cellulosic biomass is an endothermic process, whereas catalytic reduction reactions are exothermic. Thus, the excess heat generated by the in situ catalytic reduction reaction(s) may be utilized to drive the hydrothermal digestion with little opportunity for heat transfer loss to occur, thereby lowering the amount of additional heat energy input needed to conduct the digestion.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, valving, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other substances may be present within cellulosic biomass that can be especially problematic to deal with in an energy- and cost-efficient manner. Sulfur- and/or nitrogen-containing amino acids or other catalyst poisons may be present in cellulosic biomass. If not removed, these catalyst poisons can impact the catalytic reduction reaction(s) used to stabilize soluble carbohydrates, thereby resulting in process downtime for catalyst regeneration and/or replacement and reducing the overall energy efficiency when restarting the process. This issue is particularly significant for in situ catalytic reduction reaction processes, where there is minimal opportunity to address the presence of catalyst poisons, at least without significantly increasing process complexity and cost. As mentioned above, lignin can also be particularly problematic to deal with if it is not removed prior to beginning digestion. During cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY

The present disclosure generally relates to digestion of cellulosic biomass solids, and, more specifically, to methods and systems for promoting effective hydrogen gas distribution within cellulosic biomass solids during hydrothermal digestion for in situ stabilization of soluble carbohydrates.

In some embodiments, the present disclosure provides methods comprising: providing cellulosic biomass solids in a hydrothermal digestion unit in the presence of a digestion solvent and a slurry catalyst capable of activating molecular hydrogen; and heating the cellulosic biomass solids and the digestion solvent in the presence of molecular hydrogen, thereby forming an alcoholic component derived from the cellulosic biomass solids, at least a portion of the molecular hydrogen being introduced to the hydrothermal digestion unit via a plurality of spaced apart fluid inlets vertically disposed about the height of the hydrothermal digestion unit.

In one embodiment, the alcoholic component is formed by a catalytic reduction reaction of soluble carbohydrates, the soluble carbohydrates being derived from the cellulosic biomass solids. In another embodiment, the slurry catalyst comprises a poison-tolerant catalyst. In one embodiment, the poison-tolerant catalyst comprises a sulfided catalyst.

In one embodiment, the molecular hydrogen is continuously introduced to the hydrothermal digestion unit via the plurality of spaced apart fluid inlets while heating takes place. In one embodiment, at least a portion of the molecular hydrogen is introduced to the hydrothermal digestion unit via a fluid inlet disposed on a bottom surface of the hydrothermal digestion unit. In another embodiment, at least a portion of the molecular hydrogen being introduced to the hydrothermal digestion unit via the plurality of spaced apart fluid inlets comprises recirculated molecular hydrogen. In another embodiment, the molecular hydrogen is distributed in the cellulosic biomass solids once introduced from the plurality of spaced apart fluid inlets.

In one embodiment, the method further comprises removing molecular hydrogen from the hydrothermal digestion unit at a location above an uppermost of the spaced apart fluid inlets; and returning the molecular hydrogen to the hydrothermal digestion unit via the plurality of spaced apart fluid inlets. In another embodiment, the method further comprises removing at least a portion of the digestion solvent and the molecular hydrogen from the hydrothermal digestion unit, the digestion solvent and the molecular hydrogen being removed from the hydrothermal digestion unit as a mixture; and returning the digestion solvent and the molecular hydrogen to the hydrothermal digestion unit, the molecular hydrogen from the mixture being returned to the hydrothermal digestion unit via a plurality of spaced apart locations vertically disposed about the height of the hydrothermal digestion unit.

In one embodiment, the method further comprises removing at least a portion of the molecular hydrogen from the hydrothermal digestion unit; and returning the molecular hydrogen to the hydrothermal digestion unit, the molecular hydrogen being returned to the hydrothermal digestion unit via the fluid inlet disposed on a bottom surface of the hydrothermal digestion unit. In yet another embodiment, the method further comprises at least partially distributing the slurry catalyst in the cellulosic biomass solids using fluid flow.

In one embodiment, the method further comprises removing at least a portion of the digestion solvent and the molecular hydrogen from the hydrothermal digestion unit, the digestion solvent and the molecular hydrogen being removed from the hydrothermal digestion unit as a mixture; and returning the digestion solvent and the molecular hydrogen to the hydrothermal digestion unit, the molecular hydrogen being returned to the hydrothermal digestion unit via the plurality of spaced apart fluid inlets.

In one embodiment, the method further comprises supplying upwardly directed fluid flow from a fluid inlet disposed on a bottom surface of the hydrothermal digestion unit, the upwardly directed fluid flow comprising a gas flow, a liquid flow, or any combination thereof. In one embodiment, the upwardly directed fluid flow at least partially distributes the slurry catalyst in the cellulosic biomass solids. In another embodiment, at least a portion of the digestion solvent is removed from the hydrothermal digestion unit and returned thereto as at least a portion of the upwardly directed fluid flow. In another embodiment, at least a portion of the slurry catalyst is removed from the hydrothermal digestion unit with the digestion solvent and returned thereto as at least a portion of the upwardly directed fluid flow. In yet another embodiment, at least a portion of the molecular hydrogen is introduced to the hydrothermal digestion unit in the upwardly directed fluid flow.

In one embodiment, the plurality of spaced apart fluid inlets are operably connected to a flow dispersal system within the hydrothermal digestion unit. In another embodiment, the flow dispersal system extends into the cellulosic biomass solids. In another embodiment, the flow dispersal system forms bubbles of the molecular hydrogen, the bubbles being about 3 mm or less in size. In another embodiment, the molecular hydrogen is distributed as bubbles in the cellulosic biomass solids, the bubbles being about 3 mm or less in size when introduced to the hydrothermal digestion unit from a first spaced apart fluid inlet and reaching a maximum size of about 20 mm as the bubbles rise in the cellulosic biomass solids, before the bubbles reach a second spaced apart fluid inlet located above the first spaced apart fluid inlet and additional molecular hydrogen is introduced to the hydrothermal digestion unit from the second spaced apart fluid inlet.

In one embodiment, the plurality of spaced apart locations comprises the plurality of fluid inlets. In another embodiment, the plurality of spaced apart locations comprises a second plurality of fluid inlets.

In one embodiment, the digestion solvent and the molecular hydrogen are returned to the hydrothermal digestion unit as a mixture. In another embodiment, the digestion solvent and the molecular hydrogen are separated from one another before being returned to the hydrothermal digestion unit. In another embodiment, the digestion solvent and the molecular hydrogen are removed from the hydrothermal digestion unit at a first portion of the plurality of spaced apart locations and returned to the hydrothermal digestion unit via a second portion of the plurality of spaced apart locations. In another embodiment, the digestion solvent and the molecular hydrogen are removed from the hydrothermal digestion unit at a location above an uppermost of the spaced apart fluid inlets. In another embodiment, the digestion solvent and the molecular hydrogen are removed from the hydrothermal digestion unit at a plurality of spaced apart locations vertically disposed about the height of the hydrothermal digestion unit. In yet another embodiment, the plurality of spaced apart locations comprises a first portion of the spaced apart fluid inlets, and the digestion solvent and molecular hydrogen are returned to the hydrothermal digestion unit via a second portion of the spaced apart fluid inlets.

In some embodiments, the present disclosure provides biomass conversion systems comprising: a hydrothermal digestion unit; a plurality of spaced apart fluid inlets vertically disposed about the height of the hydrothermal digestion unit; and a gas recirculation line configured to remove a gas from the hydrothermal digestion unit and return at least a portion of the gas to the hydrothermal digestion unit via the plurality of spaced apart fluid inlets, the gas recirculation line being fluidly connected to the plurality of spaced apart fluid inlets.

In one embodiment, the biomass conversion system further comprises a fluid inlet disposed on a bottom surface of the hydrothermal digestion unit. In one embodiment, the gas recirculation line is fluidly connected to the fluid inlet disposed on a bottom surface of the hydrothermal digestion unit. In another embodiment, the gas recirculation line is fluidly connected to the hydrothermal digestion unit at a location above an uppermost of the spaced apart fluid inlets.

In one embodiment, the biomass conversion system further comprises a fluid recirculation line configured to remove a mixture of a gas and a liquid from the hydrothermal digestion unit and return at least a portion of the gas to the hydrothermal digestion unit. In one embodiment, the fluid recirculation line is fluidly connected to the hydrothermal digestion unit at a location above an uppermost of the spaced apart fluid inlets. In another embodiment, the fluid recirculation line is fluidly connected to the hydrothermal digestion unit at multiple spaced apart locations vertically disposed about the height of the hydrothermal digestion unit. In another embodiment, the fluid recirculation line is fluidly connected to the plurality of spaced apart fluid inlets. In another embodiment, the fluid recirculation line is fluidly connected to a second plurality of spaced apart fluid inlets vertically disposed about the height of the hydrothermal digestion unit, the second plurality of spaced apart fluid inlets not being fluidly connected to the gas recirculation line. In one embodiment, the biomass conversion system further comprises a flow dispersal system within the hydrothermal digestion unit that is operably connected to the second plurality of spaced apart fluid inlets.

In one embodiment, the biomass conversion system further comprises a solids introduction mechanism operatively coupled to the top of the hydrothermal digestion unit. In another embodiment, the biomass conversion system further comprises a transfer line fluidly coupled to the hydrothermal digestion unit and configured to remove a fluid from a lower portion of the hydrothermal digestion unit and return the fluid to an upper portion of the hydrothermal digestion unit. In another embodiment, the biomass conversion system further comprises a reactor housing a condensation catalyst, the reaction being in fluid communication with the hydrothermal digestion unit. In yet another embodiment, the biomass conversion system further comprises a flow dispersal system within the hydrothermal digestion unit that is operably connected to the spaced apart fluid inlets.

In some embodiments, the present disclosure provides biomass conversion systems comprising: a hydrothermal digestion unit; a plurality of spaced apart fluid inlets vertically disposed about the height of the hydrothermal digestion unit; and a fluid recirculation line configured to remove a mixture of a liquid and a gas from the hydrothermal digestion unit and return at least a portion of the gas to the hydrothermal digestion unit via the plurality of spaced apart fluid inlets, the fluid recirculation line being fluidly connected to the plurality of spaced apart fluid inlets.

In one embodiment, the biomass conversion system further comprises a fluid inlet disposed on a bottom surface of the hydrothermal digestion unit. In one embodiment, the fluid recirculation line is fluidly connected to the fluid inlet disposed on a bottom surface of the hydrothermal digestion unit.

In one embodiment, the biomass conversion system further comprises a gas recirculation line configured to remove a gas from the hydrothermal digestion unit and return at least a portion of the gas to the hydrothermal digestion unit via the fluid inlet disposed on a bottom surface of the hydrothermal digestion unit, the gas recirculation line being fluidly connected to the fluid inlet disposed on a bottom surface of the hydrothermal digestion unit. In one embodiment, the gas recirculation line is also fluidly connected to the hydrothermal digestion unit at multiple spaced apart locations vertically disposed about the height of the hydrothermal digestion unit. In one embodiment, the gas recirculation line is fluidly connected to the hydrothermal digestion unit at a location above an uppermost of the spaced apart fluid inlets.

In one embodiment, the fluid recirculation line is fluidly connected to the hydrothermal digestion unit at a location above an uppermost of the spaced apart fluid inlets. In one embodiment, the fluid recirculation line is fluidly connected to the hydrothermal digestion unit at multiple spaced apart locations vertically disposed about the height of the hydrothermal digestion unit.

In one embodiment, the biomass conversion system further comprises a flow dispersal system within the hydrothermal digestion unit that is operably connected to the spaced apart fluid inlets. In another embodiment, the fluid recirculation line and the spaced apart fluid inlets are configured to return the gas and the liquid to the hydrothermal digestion unit as a mixture.

In one embodiment, the biomass conversion system further comprises a solids introduction mechanism operatively coupled to the top of the hydrothermal digestion unit. In another embodiment, the biomass conversion system further comprises a transfer line fluidly coupled to the hydrothermal digestion unit and configured to remove a fluid from a lower portion of the hydrothermal digestion unit and return the fluid to an upper portion of the hydrothermal digestion unit. In yet another embodiment, the biomass conversion system further comprises a reactor housing a condensation catalyst, the reaction being in fluid communication with the hydrothermal digestion unit.

The features and advantages of the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
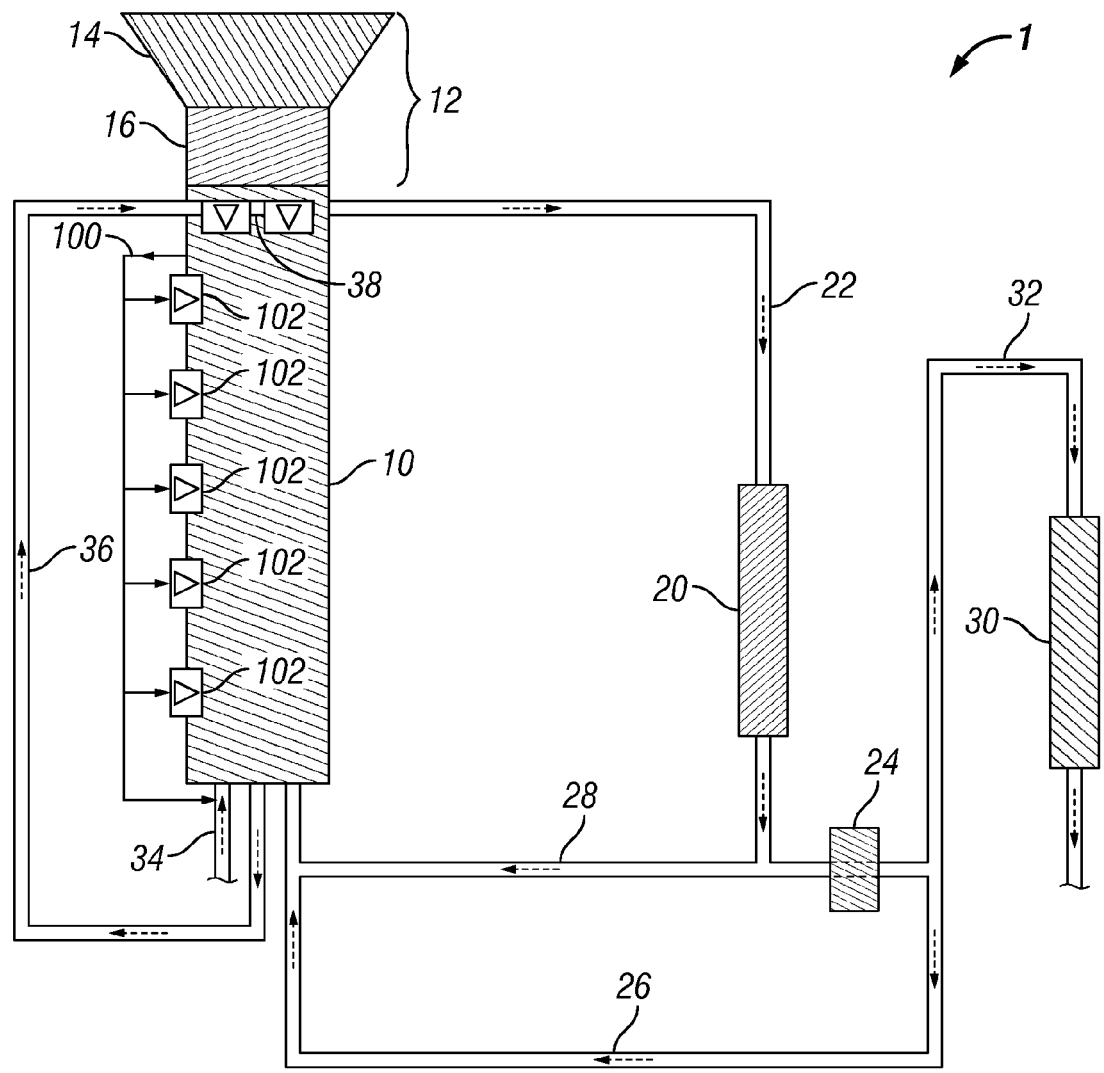
FIG. 1-7 show schematics of exemplary biomass conversion systems in which cellulosic biomass solids may be digested in the presence of a digestion solvent to produce an alcoholic component.

The present disclosure generally relates to digestion of cellulosic biomass solids, and, more specifically, to methods and systems for promoting effective hydrogen gas distribution within cellulosic biomass solids during hydrothermal digestion for in situ stabilization of soluble carbohydrates.

In embodiments provided herein, the digestion rate of cellulosic biomass solids may be accelerated in the presence of a digestion solvent. In some instances, the digestion solvent may be maintained at elevated pressures that keep the digestion solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures, as discussed above. As further discussed above, one approach for addressing the degradation of soluble carbohydrates during hydrothermal digestion is to conduct an in situ catalytic reduction reaction process to convert the soluble carbohydrates into more stable compounds as soon as possible after their formation.

Although digesting cellulosic biomass solids by an in situ catalytic reduction reaction process may be particularly suitable for at least the reasons noted above, successfully executing such a coupled approach may be problematic in other aspects, especially when the height of a cellulosic biomass charge becomes substantial. One significant issue that may be encountered is adequate catalyst distribution within the digesting cellulosic biomass solids, since insufficient catalyst distribution can result in poor stabilization of soluble carbohydrates. Although a catalyst might be pre-mixed or co-blended with cellulosic biomass solids and then subjected to an in situ catalytic reduction reaction process, these solutions may still produce an inadequate catalyst distribution and present significant engineering challenges that markedly increase process complexity and operational costs. In contrast, the present inventor discovered a relatively simple and low cost engineering solution whereby a slurry catalyst may be at least partially distributed within cellulosic biomass solids using fluid flow to convey the slurry catalyst particulates into the interstitial spaces within a charge of cellulosic biomass solids. Although the slurry catalyst may be conveyed into the cellulosic biomass solids using fluid flow from any direction, the present inventor considers it most preferable to have at least a portion of the slurry catalyst be conveyed by upwardly directed fluid flow, or at least that upwardly directed fluid flow be present, since such fluid flow may promote expansion of the cellulosic biomass solids and disfavor gravity-induced compaction that occurs during their addition and digestion. In addition, when upwardly directed fluid flow is present, there may be a reduced need to utilize mechanical stirring or like mechanical agitation techniques that might otherwise be needed to obtain an adequate catalyst distribution in the cellulosic biomass solids.

Suitable techniques for using fluid flow to distribute a slurry catalyst within cellulosic biomass solids in contact with a continuous liquid phase are described in commonly owned U.S. Patent Applications 61/665,727 and 61/665,627, each filed on Jun. 28, 2012 and incorporated herein by reference in its entirety. As described therein, cellulosic biomass solids may have at least some innate propensity for retaining a slurry catalyst being conveyed by fluid flow, and at least a portion of the cellulosic biomass solids may be sized to better promote such retention. In addition, using fluid flow, particularly upwardly directed fluid flow, to force a slurry catalyst to actively circulate through a charge of digesting cellulosic biomass solids may ensure an adequate slurry catalyst distribution as well as advantageously reduce thermal gradients that may occur during hydrothermal digestion. As a further advantage, active circulation of the slurry catalyst may address the problem created by the production of cellulosic biomass fines, since they may be co-circulated with the slurry catalyst for continued digestion to take place.

In addition to the difficulties associated with distributing a slurry catalyst within cellulosic biomass solids, the present inventor discovered that effective distribution of molecular hydrogen can also be problematic. As with a poorly distributed slurry catalyst, inadequate distribution of molecular hydrogen can likewise result in poor stabilization of soluble carbohydrates during in situ catalytic reduction reaction processes. As described above, an upwardly directed fluid flow can at least partially fluidize a slurry catalyst and/or a least partially expand a charge of cellulosic biomass solids during an in situ catalytic reduction reaction process. One way in which an upwardly directed fluid flow can be provided to the cellulosic biomass solids is via an upwardly directed flow of molecular hydrogen. For example, an inflow of molecular hydrogen may produce bubbles that percolate upward through the cellulosic biomass solids to provide at least a portion of the upwardly directed fluid flow. Although this approach can oftentimes be effective for conveying a slurry catalyst into cellulosic biomass solids, it may not always produce an adequate distribution of molecular hydrogen throughout the entirety of the cellulosic biomass solids, particularly as the vertical height of the charge of cellulosic biomass solids increases, as discussed hereinafter. Locations in which there is an inadequate distribution of molecular hydrogen may still experience poor stabilization of soluble carbohydrates, even if an effective slurry catalyst distribution has taken place.

Effective distribution of molecular hydrogen within the entirety of a charge of cellulosic biomass solids can be dependent upon maintaining the molecular hydrogen at a bubble size small enough for the bubbles to become distributed within the interstitial space throughout the cellulosic biomass solids. If a sufficient number of small hydrogen bubbles coalesce into larger bubbles, an increasingly poor distribution of molecular hydrogen within the cellulosic biomass solids may be realized, particularly at locations farther removed from the location(s) at which the molecular hydrogen is introduced to the cellulosic biomass solids. For example, molecular hydrogen introduced at the bottom of a charge of cellulosic biomass solids may retain a sufficiently small hydrogen bubble size for only a portion of the bubbles' transit to the top of the charge. As a result, poor stabilization of soluble carbohydrates can occur in the locations where excessive hydrogen bubble coalescence has occurred, particularly in the upper portions of a charge of cellulosic biomass solids. Factors leading to hydrogen bubble coalescence may include, for example, surface tension effects as the bubbles rise in the cellulosic biomass solids, particularly in the presence of aqueous solvents. Liberation of natural surfactants from the cellulosic biomass solids during hydrothermal digestion may also play a role in hydrogen bubble coalescence.

The present inventor recognized that for an effective stabilization of soluble carbohydrates to take place during an in situ catalytic reduction reaction process, a good distribution of both the slurry catalyst and molecular hydrogen would have to be realized over the entire height of a charge of cellulosic biomass solids. More particularly, the present inventor recognized that sufficiently small bubbles of molecular hydrogen would need to be maintained throughout the entirety of the cellulosic biomass solids in order for an adequate degree of molecular hydrogen distribution to be realized. As one solution for maintaining small bubbles of molecular hydrogen throughout the entirety of a continuous liquid phase in contact with cellulosic biomass solids, the present inventor discovered processes whereby the vertical height of the continuous liquid phase may be minimized and/or regulated to lessen the opportunity for hydrogen bubble coalescence to occur. In such approaches, described in commonly owned U.S. Provisional Patent Application 61/740,039, entitled "Methods and Systems for Promoting Hydrogen Gas Distribution Within Cellulosic Biomass Solids During Hydrothermal Digestion" and filed on Dec. 20, 2012, a portion of the cellulosic biomass solids are in contact with a continuous liquid phase and a portion of the cellulosic biomass solids are in contact with a continuous gas phase comprising molecular hydrogen. As further described therein, slurry catalyst distribution within the cellulosic biomass solids contacting the continuous gas phase may be affected by downwardly percolating a mixture of the slurry catalyst and a fluid phase therethrough. However, in such approaches, digestion of the cellulosic biomass solids in the continuous gas phase may occur more slowly than if all the cellulosic biomass solids were directly contacting a digestion solvent, and somewhat complex engineering and process control measures may be needed.

As an alternative to the foregoing approach, the present inventor recognized that an effective distribution of molecular hydrogen throughout a charge of cellulosic biomass solids could be realized by introducing molecular hydrogen at multiple locations vertically spaced apart along the height of a charge of cellulosic biomass solids. In doing so, even if hydrogen bubble coalescence occurs, the vertical disposition of the introduced molecular hydrogen may be varied such that molecular hydrogen bubbles of a desired size are present throughout the cellulosic biomass solids.

Although the introduction of molecular hydrogen to cellulosic biomass solids at multiple vertically spaced apart locations may necessitate the input of significantly more molecular hydrogen than is ordinarily necessary to effectively stabilize soluble carbohydrates during an in situ catalytic reduction reaction process, the excess molecular hydrogen may be recirculated multiple times to the cellulosic biomass solids. Recirculation of the molecular hydrogen may lessen the expense associated with the molecular hydrogen supply and reduce the difficulties associated with storing large amounts of this gas. Recirculation of molecular hydrogen to the cellulosic biomass solids may take place by withdrawing excess molecular hydrogen from a gas headspace above the cellulosic biomass solids and/or by withdrawing a mixture of the digestion solvent and excess molecular hydrogen from the cellulosic biomass solids, and thereafter returning the molecular hydrogen to the cellulosic biomass solids to continue the stabilization of soluble carbohydrates. Molecular hydrogen removed from the cellulosic biomass solids as an admixture with the digestion solvent may be returned to the cellulosic biomass solids as an admixture, or the molecular hydrogen may be separated from the digestion solvent before being returned to the cellulosic biomass solids. These and other various techniques for returning molecular hydrogen to the cellulosic biomass solids are discussed in greater detail hereinafter.

In addition to promoting a more effective distribution of molecular hydrogen within a charge of cellulosic biomass solids, introduction of molecular hydrogen to the cellulosic biomass solids at multiple vertically spaced apart locations may provide additional advantages as well. In addition to molecular hydrogen, slurry catalyst particulates may be introduced and recirculated to the cellulosic biomass solids at multiple vertically spaced apart locations as well. The introduction of slurry catalyst particulates at multiple vertically spaced apart locations may promote a better distribution of the slurry catalyst than if catalyst distribution were to be affected using only an upwardly directed fluid flow. Moreover, recirculation of a fluid phase at multiple vertically spaced apart locations may lessen the occurrence of thermal gradients within the cellulosic biomass solids. For example, recirculation of a fluid phase from a higher temperature zone to a lower temperature zone, or vice versa, within the cellulosic biomass solids may allow the digestion temperature to be made more uniform. By using multiple fluid introduction locations, as described herein, an unstirred hydrothermal digestion unit may be made to emulate a more costly and difficult-to-operate stirred tank hydrothermal digestion unit.

In addition to the foregoing, the use of multiple vertically spaced apart fluid introduction locations may allow the difficulties associated with heterogeneous phase formation to be mitigated. While digesting cellulosic biomass solids by an in situ catalytic reduction reaction process in the presence of a slurry catalyst and an aqueous phase digestion solvent, where the cellulosic biomass solids were supplied on an ongoing basis, the present inventor discovered that lignin from the cellulosic biomass solids eventually separated as a phenolics liquid phase that was neither fully dissolved nor fully precipitated, but instead formed as a discrete liquid phase that was highly viscous and hydrophobic. The slurry catalyst was well wetted by the phenolics liquid phase and accumulated therein over time, thereby making the slurry catalyst less readily distributable in the cellulosic biomass solids (e.g., by using upwardly directed fluid flow). In many instances, the phenolics liquid phase was below the aqueous phase, which also contained an alcoholic component derived from the cellulosic biomass solids via a catalytic reduction reaction of soluble carbohydrates. Depending on the ratio of water and organic solvent in the digestion solvent, rates of fluid flow, catalyst identity, reaction times and temperatures, and the like, a light organics phase was also sometimes observed, typically above the aqueous phase, where the components of the light organics phase were also derived, at least in part, from the cellulosic materials in the biomass. Components present in the light organics phase included, for example, the alcoholic component derived from the cellulosic biomass solids, including $C_4$ or greater alcohols, and self-condensation products, such as those obtained by the acid-catalyzed Aldol reaction. The use of multiple fluid introduction locations may help keep this two- or three-phase liquid mixture well mixed for distributing the slurry catalyst in the cellulosic biomass solids and for subsequent downstream processing. Techniques for processing an alcoholic component from a two- or three-phase liquid mixture containing a phenolics liquid phase are described in more detail in commonly owned U.S. Patent Application 61/720,689, filed on Oct. 31, 2012 and incorporated herein by reference in its entirety. In the alternative, the alcoholic component can be processed separately from the phenolics liquid phase as described in commonly owned U.S. Patent Application 61/720,747, also filed on Oct. 31, 2012 and incorporated herein by reference in its entirety.

Unless otherwise specified, it is to be understood that use of the terms "biomass" or "cellulosic biomass" in the description herein refers to "cellulosic biomass solids." Solids may be in any size, shape, or form. The cellulosic biomass solids may be natively present in any of these solid sizes, shapes, or forms, or they may be further processed prior to hydrothermal digestion. In some embodiments, the cellulosic biomass solids may be chopped, ground, shredded, pulverized, and the like to produce a desired size prior to hydrothermal digestion. In some or other embodiments, the cellulosic biomass solids may be washed (e.g., with water, an acid, a base, combinations thereof, and the like) prior to hydrothermal digestion taking place.

In practicing the present embodiments, any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. Once soluble carbohydrates have been produced through hydrothermal digestion according to the embodiments described herein, the soluble carbohydrates may be transformed into a more stable reaction product comprising a monohydric alcohol, a glycol, a triol, or any combination thereof, at least some of which may also contain a carbonyl functionality. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof.

As used herein, the term "phenolics liquid phase" will refer to a fluid phase comprising liquefied lignin. In some embodiments, the phenolics liquid phase may be more dense than water, but it may also be less dense than water depending on lignin concentrations and the presence of other components, for example.

As used herein, the term "light organics phase" will refer to a fluid phase that is typically less dense than water and comprises an organic compound. The organic compound may include at least a portion of an alcoholic component formed via catalytic reduction of soluble carbohydrates, which may include $C_4$ or greater alcohols and self-condensation products thereof.

As used herein, the terms "distribute," "distribution", and related variants thereof will refer to the dispersal of a substance throughout a charge of cellulosic biomass solids. No particular degree or type of distribution is implied by use of the terms "distribute," "distribution" or their variants. As used herein, the phrases "at least partially distribute" and "distribute at least a portion of" will be used synonymously with one another.

As used herein, the term "recirculated molecular hydrogen" will refer to molecular hydrogen that has been removed from and subsequently reintroduced to cellulosic biomass solids or a vessel containing cellulosic biomass solids (e.g., a hydrothermal digestion unit) multiple times.

As used herein, the term "fluid inlet" will be used to refer to a conduit that is configured to convey a gas, a liquid, a fluidizable solid, or any combination thereof therethrough and into a vessel. Moreover, it is to be recognized that, in some embodiments, a fluid inlet may also be used to withdraw a gas, a liquid, a fluidizable solid, or any combination thereof from a vessel. That is, in some embodiments, a fluid inlet may also be operated as a fluid outlet, if desired.

As used herein, the term "hydrothermal digestion unit" refers to a vessel in which the digestion of cellulosic biomass solids is conducted.

In some embodiments, methods described herein can comprise: providing cellulosic biomass solids in a hydrothermal digestion unit in the presence of a digestion solvent and a slurry catalyst capable of activating molecular hydrogen; introducing molecular hydrogen to the hydrothermal digestion unit via a plurality of spaced apart fluid inlets vertically disposed about the height of the hydrothermal digestion unit, and heating the cellulosic biomass solids and the digestion solvent in the presence of the introduced molecular hydrogen, thereby forming an alcoholic component derived from the cellulosic biomass solids.

The molecular hydrogen may be introduced to the hydrothermal digestion unit via the plurality of spaced apart fluid inlets in a manner such that the molecular hydrogen is effectively distributed in the cellulosic biomass solids. In some embodiments, the molecular hydrogen may be continuously introduced to the hydrothermal digestion unit via the plurality of spaced apart fluid inlets while heating takes place. While a continuous introduction of molecular hydrogen to the hydrothermal digestion unit may promote ongoing fluidization of the slurry catalyst and provide molecular hydrogen for distribution in the cellulosic biomass solids, it is to be recognized that discontinuous introduction of the molecular hydrogen may be employed as well. For example, a pulsed addition of molecular hydrogen from the spaced apart fluid inlets may, in some embodiments, still allow a good distribution of molecular hydrogen in the cellulosic biomass solids to be realized. Moreover, in some embodiments, introduction of molecular hydrogen via the spaced apart fluid inlets may be conducted in a manner such that not all of the fluid inlets are introducing molecular hydrogen to the hydrothermal digestion unit at the same time. For example, in some embodiments, introduction of molecular hydrogen from the spaced apart fluid inlets may be sequenced such that they are not all introducing molecular hydrogen at the same time. Non-limiting sequencing protocols for discontinuous introduction of molecular hydrogen from the spaced apart fluid inlets may include, for example, introducing molecular hydrogen from alternating fluid inlets, introducing molecular hydrogen from the fluid inlets one at a time in order of their vertical disposition, and various combinations thereof. Various other protocols of fluid inlet sequencing for implementation in a particular application may be envisioned by one having ordinary skill in the art.

In addition to sequencing the introduction of molecular hydrogen from the spaced apart fluid inlets, the introduction of molecular hydrogen from each fluid inlet need not necessarily take place for the same length of time. In some embodiments, the introduction of molecular hydrogen at each fluid inlet may take place for the substantially the same length of time. In other embodiments, however, the introduction of molecular hydrogen at one or more of the fluid inlets may take place for different lengths of time.

As discussed above, by introducing molecular hydrogen to a hydrothermal digestion unit at multiple locations that are vertically spaced apart from one another, a better distribution of the molecular hydrogen in cellulosic biomass solids therein may be realized. The molecular hydrogen may be distributed as bubbles within the cellulosic biomass solids after being introduced to the hydrothermal digestion unit via the plurality of spaced apart fluid inlets. Production of a small bubble size may be desirable for facilitating molecular hydrogen distribution. In some embodiments, the bubbles of molecular hydrogen may have a maximum size of about 10 mm when introduced to the hydrothermal digestion unit from the spaced apart fluid inlets. In other embodiments, the bubbles of molecular hydrogen may have a maximum size of about 9 mm, or about 8 mm, or about 7 mm, or about 6 mm, or about 5 mm, or about 4 mm, or about 3 mm, or about 2 mm, or about 1 mm when introduced to the hydrothermal digestion unit from the spaced apart fluid inlets.

After the bubbles of molecular hydrogen have been introduced to the hydrothermal digestion unit, they may at least partially coalesce as they percolate upward through the cellulosic biomass solids. Total coalescence of the bubbles of molecular hydrogen may result in formation of a continuous gas phase in at least a portion of the hydrothermal digestion unit. Partial coalescence of the bubbles of molecular hydrogen may result in bubbles that are too large to become effectively distributed in the cellulosic biomass solids and mediate the stabilization of soluble carbohydrates during hydrothermal digestion. As described above, hydrogen bubble coalescence may be addressed by introducing additional molecular hydrogen to the hydrothermal digestion unit in locations where the bubbles have reached a size that is too large and are no longer effective for stabilizing soluble carbohydrates. For example, in some embodiments, the bubbles of molecular hydrogen may be a first size (e.g., about 3 mm or less) when they are introduced to the hydrothermal digestion unit from a first spaced apart fluid inlet and reach a second size (e.g., a maximum size of about 20 mm) as the bubbles rise in the cellulosic biomass solids, before the bubbles reach a second spaced apart fluid inlet located above the first spaced apart fluid inlet and additional molecular hydrogen is introduced to the hydrothermal digestion unit from the second spaced apart fluid inlet. In some embodiments, the bubbles of molecular hydrogen may reach a maximum size of about 1 cm before additional molecular hydrogen is introduced to the hydrothermal digestion unit at a location where this bubble size has been reached. In other embodiments, the bubbles of molecular hydrogen may reach a maximum size of about 2 cm, or about 3 cm, or about 4 cm, or about 5 cm, or about 6 cm, or about 7 cm, or about 8 cm, or about 9 cm, or about 10 cm before additional molecular hydrogen is introduced to the hydrothermal digestion unit at a location where this bubble size has been reached. Ultimately, the bubble size may become as large as the diameter of the hydrothermal digestion unit. It is to be recognized that additional molecular hydrogen may be introduced to the hydrothermal digestion unit via the spaced apart fluid inlets before a maximum effective hydrogen gas bubble size has been reached. By introducing additional molecular hydrogen to the hydrothermal digestion unit before a maximum effective bubble size has been reached, a margin of error can be established for maintaining an effective distribution of molecular hydrogen in the cellulosic biomass solids.

In some embodiments, the plurality of spaced apart fluid inlets may be operably connected to a flow dispersal system within the hydrothermal digestion unit. In various embodiments, the flow dispersal system may be configured to produce bubbles of molecular hydrogen, including the bubble sizes noted above, such as bubbles of about 3 mm or less in size, for example. However, in other embodiments, the bubbles of molecular hydrogen may be formed in a fluid phase prior to being introduced to the hydrothermal digestion unit, and the flow distributor may better spread the fluid phase and bubbles therein once introduced to the hydrothermal digestion unit. Suitable flow dispersal systems are not believed to be particularly limited in form, size, or shape. In various embodiments, suitable flow dispersal systems may comprise, for example, slotted flow distributors, flow distributors containing a plurality of holes (e.g., sparging frits), manifolds, combinations thereof, and the like. In some embodiments, the flow dispersal system may extend into the cellulosic biomass solids. By having the flow dispersal system extend or partially extend into the cellulosic biomass solids, the molecular hydrogen introduced therefrom may be better positioned to become distributed within the cellulosic biomass solids. However, in other embodiments, the flow dispersal system need not necessarily extend into the cellulosic biomass solids. In such embodiments, the linear velocity of the molecular hydrogen exiting the flow dispersal system may be sufficient to carry the molecular hydrogen into the cellulosic biomass solids for distribution therein, for example.

Molecular hydrogen may also be introduced to the hydrothermal digestion unit in locations other than from the plurality of spaced apart fluid inlets vertically disposed about the height of the hydrothermal digestion unit. In some embodiments, at least a portion of the molecular hydrogen may be introduced to the hydrothermal digestion unit via a fluid inlet disposed on the bottom surface of the hydrothermal digestion unit. Molecular hydrogen introduced from the bottom surface of the hydrothermal digestion unit may be used to stabilize the lowermost cellulosic biomass solids disposed therein, although the spaced apart fluid inlets on the sidewalls of the hydrothermal digestion unit may also accomplish this purpose if they are properly positioned. In some embodiments, a flow dispersal system, including those described above, may be operatively coupled to the fluid inlet disposed on the bottom surface of the hydrothermal digestion unit so as to better promote the distribution of molecular hydrogen introduced therefrom.

As discussed above, the introduction of molecular hydrogen to cellulosic biomass solids from multiple locations in order to maintain an effective distribution of the molecular hydrogen therein may result in significantly excess amounts of the molecular hydrogen being present. Although there is no express requirement to do so, in some embodiments, at least a portion of the molecular hydrogen being introduced to the hydrothermal digestion unit via the plurality of spaced apart fluid inlets may comprise recirculated molecular hydrogen. Likewise, at least a portion of the molecular hydrogen being introduced from a fluid inlet disposed on the bottom surface of the hydrothermal digestion unit may also comprise recirculated molecular hydrogen. That is, in some embodiments, at least a portion of the molecular hydrogen entering the hydrothermal digestion unit may have been removed from the hydrothermal digestion unit and subsequently returned thereto. In various embodiments, fresh molecular hydrogen (i.e., not recirculated molecular hydrogen) may be added to the hydrothermal digestion unit as needed in order to maintain the hydrogen partial pressure therein as recirculated molecular hydrogen is consumed. Fresh molecular hydrogen may be added to the hydrothermal digestion unit via the plurality of spaced apart fluid inlets, the fluid inlet disposed on the bottom surface of the hydrothermal digestion unit, or from another location. In some embodiments, fresh molecular hydrogen may be introduced to the hydrothermal digestion unit via the fluid inlet disposed on the bottom surface of the hydrothermal digestion unit, and recirculated molecular hydrogen may be introduced to the hydrothermal digestion unit via the spaced apart fluid inlets. In some embodiments, recirculated molecular hydrogen may also be introduced via the fluid inlet disposed on the bottom surface of the hydrothermal digestion unit. Fresh molecular hydrogen may be added to the hydrothermal digestion unit at the same time that recirculated molecular hydrogen is being added, or fresh molecular hydrogen may be added separately from the recirculated molecular hydrogen.

In some embodiments, methods described herein may further comprise removing at least a portion of the molecular hydrogen from the hydrothermal digestion unit, and returning the molecular hydrogen to the hydrogen to the hydrothermal digestion unit via the plurality of spaced apart fluid inlets. In some or other embodiments, methods described herein may further comprise removing at least a portion of the molecular hydrogen from the hydrothermal digestion unit, and returning the molecular hydrogen to the hydrothermal digestion unit via the fluid inlet disposed on the bottom surface of the hydrothermal digestion unit. Further discussion of how the molecular hydrogen may be removed from the hydrothermal digestion unit and then be returned thereto follows below.

Molecular hydrogen being recirculated to the hydrothermal digestion unit may comprise molecular hydrogen alone (i.e., gaseous molecular hydrogen) and/or molecular hydrogen admixed with another fluid phase (e.g., the digestion solvent). Gaseous molecular hydrogen may be removed from a headspace of the hydrothermal digestion unit after the molecular hydrogen has passed through the cellulosic biomass solids. Thereafter, the molecular hydrogen may be returned to the hydrothermal digestion unit via the plurality of spaced apart fluid inlets and/or the fluid inlet disposed on the bottom surface of the hydrothermal digestion unit. Molecular hydrogen may also be removed from the hydrothermal digestion unit as a mixture with a fluid phase (e.g., the digestion solvent). Although an admixture of the fluid phase and molecular hydrogen may be directly recirculated to the hydrothermal digestion unit, as described in more detail below, gaseous molecular hydrogen may also be separated from the admixture and returned to the hydrothermal digestion unit separately from the fluid phase.

In some embodiments, gaseous molecular hydrogen may be directly recirculated to the hydrothermal digestion unit. In some embodiments, the methods described herein may further comprise removing molecular hydrogen from the hydrothermal digestion unit at a location above an uppermost of the spaced apart fluid inlets (e.g., from a headspace of the hydrothermal digestion unit), and returning the molecular hydrogen to the hydrothermal digestion unit via the plurality of spaced apart fluid inlets. In addition, the molecular hydrogen may be returned to the hydrothermal digestion unit via the fluid inlet disposed on the bottom surface of the hydrothermal digestion unit. As discussed above, fresh molecular hydrogen may also be introduced in combination with the recirculated molecular hydrogen.

In some embodiments, a mixture of the digestion solvent and molecular hydrogen may be removed from the hydrothermal digestion unit, and the molecular hydrogen may then be returned to the hydrothermal digestion unit. Return of the molecular hydrogen to the hydrothermal digestion unit may take place without separating it from the digestion solvent, or the molecular hydrogen may be separated from the digestion solvent and returned to the hydrothermal digestion unit separately. If used, suitable gas-liquid separation techniques will be familiar to one having ordinary skill in the art. Moreover, in some embodiments, return of a mixture of the digestion solvent and molecular hydrogen to the hydrothermal digestion unit may also take place concurrently with gaseous molecular hydrogen being returned to the hydrothermal digestion unit. That is, molecular hydrogen that is removed from the hydrothermal digestion unit from both the headspace of the hydrothermal digestion unit and admixed with the digestion solvent may be returned to the hydrothermal digestion unit at the same time. When both gaseous molecular hydrogen and molecular hydrogen admixed with the digestion solvent are being returned to the hydrothermal digestion unit at the same time, the molecular hydrogen from each source may be returned to the hydrothermal digestion unit via the same fluid inlet(s) or different fluid inlet(s).

When a mixture of the digestion solvent and molecular hydrogen is removed from the hydrothermal digestion unit for subsequent return of the molecular hydrogen to the hydrothermal digestion unit, the mixture may be removed from the hydrothermal digestion unit at a single location or at multiple locations. In some embodiments, the digestion solvent and molecular hydrogen may be removed from the hydrothermal digestion unit at a plurality of spaced apart locations vertically disposed about the height of the hydrothermal digestion unit. Advantages of removing the mixture of digestion solvent and molecular hydrogen from multiple vertically spaced apart locations may include, for example, regulation of thermal gradients that may occur in different vertical regions of the hydrothermal digestion unit, and conveyance of a desired phase from one location to another in the hydrothermal digestion unit. For example, in some embodiments, the process of returning molecular hydrogen to the hydrothermal digestion unit may convey an aqueous phase to a location in the hydrothermal digestion unit where a phenolics liquid phase is more predominant.

In addition to removing molecular hydrogen in a fluid phase and returning the molecular hydrogen to the hydrothermal digestion unit, other fluid phases can be conveyed in the hydrothermal digestion unit as well. In some embodiments, methods described herein may further comprise conveying at least a portion of a phenolics liquid phase and the slurry catalyst therein to a location above at least a portion of the cellulosic biomass solids and releasing them, such that the slurry catalyst contacts the cellulosic biomass solids. Such techniques for distributing a slurry catalyst in cellulosic biomass solids are described in brief hereinbelow and in greater detail in commonly owned U.S. Patent Application 61/720,757, filed on Oct. 31, 2012 and incorporated herein by reference in its entirety. Distributing the slurry catalyst in this manner can take place as an alternative to or in combination with the use of upwardly directed fluid flow for slurry catalyst distribution.

In some embodiments, recirculation of a mixture of digestion solvent and molecular hydrogen to the hydrothermal digestion unit may take place using a gas entraining pump. Suitable gas entraining pumps will be familiar to one having ordinary skill in the art. Moreover, gas entraining pumps may also pump the slurry catalyst therethrough in embodiments in which the slurry catalyst is removed with the digestion solvent, thereby aiding in distribution of the slurry catalyst in the cellulosic biomass solids. In some embodiments, conveying a mixture of digestion solvent and molecular hydrogen through the pump head of a gas entraining pump may be sufficient to form bubbles of a sufficiently small size for distribution in the cellulosic biomass solids. In other embodiments, a static mixer may be included on the pump outlet to break up the molecular hydrogen and form bubbles of a sufficiently small size for distribution in the cellulosic biomass solids. In still other embodiments, a flow dispersal system, including those described above, may be used on a fluid outlet through which an output of the gas entraining pump is being returned to the hydrothermal digestion unit in order to form bubbles of molecular hydrogen for distribution within the cellulosic biomass solids.

As an alternative to a gas entraining pump, a conventional pump and compressor may be used to return a mixture of digestion solvent and molecular hydrogen to the hydrothermal digestion unit. For example, the slurry catalyst may be removed from the digestion solvent before it is conveyed through the pump and returned to the hydrothermal digestion unit. Thereafter, the slurry catalyst may be returned to the hydrothermal digestion unit, if desired, as a separate fluid stream.

As discussed above, when a mixture of digestion solvent and molecular hydrogen is removed from the hydrothermal digestion unit for subsequent return thereto, the molecular hydrogen from the mixture can be returned to the hydrothermal digestion unit in combination with gaseous molecular hydrogen removed from a headspace of the hydrothermal digestion unit, or the molecular hydrogen from the mixture can be the sole source of recirculated molecular hydrogen. When being returned in combination with gaseous molecular hydrogen, the molecular hydrogen from the mixture and the gaseous molecular hydrogen may be returned to the hydrothermal digestion unit at the same location, or they may be returned at different locations. Moreover, the molecular hydrogen from the mixture may be returned to the hydrothermal digestion unit after being separated from the digestion solvent, or it may remain in admixture with the digestion solvent when being returned to the hydrothermal digestion unit.

In some embodiments, methods described herein may further comprise removing at least a portion of the digestion solvent and the molecular hydrogen as a mixture from the hydrothermal digestion unit, and returning the digestion solvent and the molecular hydrogen to the hydrothermal digestion unit, where the molecular hydrogen from the mixture is returned to the hydrothermal digestion unit via a plurality of spaced apart locations vertically disposed about the height of the hydrothermal digestion unit. The plurality of spaced apart locations may comprise the plurality of fluid inlets. If molecular hydrogen from the mixture is being recirculated to the hydrothermal digestion unit in combination with gaseous molecular hydrogen, the plurality of space apart locations may comprise a second plurality of fluid inlets, if desired. That is, when molecular hydrogen from the mixture and gaseous molecular hydrogen are both being recirculated to the hydrothermal digestion unit, they may be recirculated by the same fluid inlets, or different fluid inlets. Depending on whether the molecular hydrogen from the mixture is returned to the hydrothermal digestion unit as a mixture or separated from the digestion solvent before being returned may determine the location(s) through which the molecular hydrogen is returned to the hydrothermal digestion unit. Given the benefit of the present disclosure, such considerations will be evident to one having ordinary skill in the art. In embodiments in which the digestion solvent is separated from the molecular hydrogen before being returned to the hydrothermal digestion unit, the separated digestion solvent may be returned to the hydrothermal digestion unit as another fluid stream. For example, in some embodiments, a fluid stream of separated digestion solvent may be configured as an upwardly directed fluid flow to promote distribution of the slurry catalyst in the cellulosic biomass solids.

In some embodiments, a mixture of the digestion solvent and molecular hydrogen may be removed from the hydrothermal digestion unit at one location (i.e., at one height). For example, in some embodiments, a mixture of the digestion solvent and molecular hydrogen may be removed from the hydrothermal digestion unit at a location above an uppermost of the spaced apart fluid inlets. Withdrawal of the mixture from this location can minimize the removal of molecular hydrogen that is still effective for distribution in cellulosic biomass solids. Of course, other positions for removal of a mixture of digestion solvent and molecular hydrogen from a single location are possible and can be envisioned by one having ordinary skill in the art and the benefit of the present disclosure.

In other embodiments, a mixture of the digestion solvent and molecular hydrogen can be removed from the hydrothermal digestion unit at multiple locations. In some embodiments, a mixture of the digestion solvent and molecular hydrogen may be removed from the hydrothermal digestion unit at a first portion of the spaced apart locations and returned to the hydrothermal digestion unit at a second portion of the spaced apart locations. For example, in some embodiments, a first portion of the spaced apart locations may comprise fluid outlets configured for withdrawing the mixture from the hydrothermal digestion unit and a second portion of the spaced apart locations may comprise fluid inlets configured for returning the mixture and/or separated molecular hydrogen and digestion solvent to the hydrothermal digestion unit. In other embodiments, the spaced apart locations may be configured to both withdraw the mixture from the hydrothermal digestion unit or return it thereto, and whether a particular spaced apart location is withdrawing or returning the mixture to the hydrothermal digestion unit in a particular application will be a matter of experimental determination within the abilities of one having ordinary skill in the art and the benefit of the present disclosure.

As described above, the methods set forth herein may improve the distribution of molecular hydrogen in a charge of digesting cellulosic biomass solids by introducing molecular hydrogen to the cellulosic biomass solids at a plurality of vertically spaced apart locations. In some embodiments, the methods described herein may also further comprise at least partially distributing the slurry catalyst in the cellulosic biomass solids using fluid flow. The fluid flow promoting distribution of the slurry catalyst in the cellulosic biomass solids may comprise a stream of molecular hydrogen. For example, molecular hydrogen introduced to the hydrothermal digestion unit from a fluid inlet on the bottom surface of the hydrothermal digestion unit may both become distributed in the cellulosic biomass solids and promote slurry catalyst distribution. Upward percolation of molecular hydrogen introduced from the vertically spaced apart locations may likewise become distributed in the cellulosic biomass solids and promote slurry catalyst distribution as well. In other embodiments, the fluid flow promoting slurry catalyst distribution in the cellulosic biomass solids may comprise a fluid flow used in combination with the stream of molecular hydrogen, particularly an upwardly directed fluid flow. In some embodiments, methods described herein may further comprise supplying upwardly directed fluid flow from a fluid inlet disposed on the bottom surface of the hydrothermal digestion unit, where the upwardly directed fluid flow may comprise a gas flow, a liquid flow, or any combination thereof.

In some embodiments, the upwardly directed fluid flow promoting distribution of the slurry catalyst in the cellulosic biomass solids may comprise a gas flow. As described above, in some embodiments, an upwardly directed gas flow may comprise a stream of molecular hydrogen. In some or other embodiments, steam, compressed air, or an inert gas such as nitrogen, for example, may be used in place of or in addition to a stream of molecular hydrogen. Up to about 40% steam may be present in the upwardly direct fluid flow in various embodiments. An upwardly directed gas flow may be used to distribute the slurry catalyst within the cellulosic biomass solids when it is desired to maintain the slurry catalyst within the hydrothermal digestion unit and/or when a liquid flow alone is insufficient to distribute the slurry catalyst, for example.

In some embodiments, the upwardly directed fluid flow promoting distribution of the slurry catalyst in the cellulosic biomass solids may comprise a liquid flow. An upwardly directed liquid flow may be used to distribute the slurry catalyst within the cellulosic biomass solids when it is not necessarily desired to maintain the slurry catalyst within the hydrothermal digestion unit and/or when a gas flow alone is insufficient to distribute the slurry catalyst, for example. Unlike a gas flow, described above, a liquid flow may, if the liquid flow velocity is sufficient, fluidize the slurry catalyst and carry it beyond the cellulosic biomass solids as the liquid level buids. The slurry catalyst may then exit the hydrothermal digestion unit with the flowing liquid. In some embodiments, slurry catalyst exiting the hydrothermal digestion unit may be recirculated thereto. For example, in some embodiments, at least a portion of the digestion solvent and the slurry catalyst may be removed from the hydrothermal digestion unit and returned thereto as at least a portion of the upwardly directed fluid flow. In other embodiments, the slurry catalyst may not be present in the return fluid flow to the hydrothermal digestion unit. Specifically, in some embodiments, at least a portion of the slurry catalyst may be fluidized by the upwardly directed fluid flow, but the degree of fluidization may not be sufficient to convey the slurry catalyst completely through the cellulosic biomass solids, thereby maintaining the slurry catalyst in the hydrothermal digestion unit. In some or other embodiments, the upwardly directed fluid flow may comprise a fresh digestion solvent that was not previously introduced to the hydrothermal digestion unit. The fresh digestion solvent may be introduced to the hydrothermal digestion unit in combination with a recirculation flow of the digestion solvent and, optionally, the slurry catalyst, if desired. In still other embodiment, an alcoholic component produced from the cellulosic biomass solids may be at least partially separated from the digestion solvent after exiting the hydrothermal digestion unit and subsequently be returned thereto. Benefits of returning a separated alcoholic component to the hydrothermal digestion unit may include, for example, decreasing the water content of the digestion solvent and maintaining a clean surface on the slurry catalyst to better promote stabilization of soluble carbohydrates.

In various embodiments, the alcoholic component derived from the cellulosic biomass solids may be formed by a catalytic reduction reaction of soluble carbohydrates, where the soluble carbohydrates are derived from the cellulosic biomass solids. As described above, the methods and systems described herein can help promote adequate distribution of the slurry catalyst and the molecular hydrogen throughout the cellulosic biomass solids such that the catalytic reduction reaction can more effectively take place.

In some embodiments, the catalytic reduction reaction used to produce the alcoholic component may take place at a temperature ranging between about 110° C. and about 300° C., or between about 170° C. and about 300° C., or between about 180° C. and about 290° C., or between about 150° C. and about 250° C. In some embodiments, the catalytic reduction reaction used to produce the alcoholic component may take place at a pH ranging between about 7 and about 13, or between about 10 and about 12. In other embodiments, the catalytic reduction reaction may take place under acidic conditions, such as at a pH of about 5 to about 7. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In various embodiments, the digestion solvent in which the catalytic reduction reaction is being conducted may comprise an organic solvent and water. Although any organic solvent that is at least partially miscible with water may be used as a digestion solvent, particularly suitable organic solvents are those that can be directly converted into fuel blends and other materials without being separated from the alcoholic component being produced from the cellulosic biomass solids. That is, particularly suitable organic solvents are those that may be co-processed along with the alcoholic component during downstream reforming reactions into fuel blends and other materials. Suitable organic solvents in this regard may include, for example, ethanol, ethylene glycol, propylene glycol, glycerol, and any combination thereof. In some embodiments, the digestion solvent may comprise a component derived from cellulosic biomass solids.

In some embodiments, the digestion solvent may further comprise a small amount of a monohydric alcohol. The presence of at least some monohydric alcohols in the digestion solvent may desirably enhance the hydrothermal digestion and/or the catalytic reduction reactions being conducted therein. For example, inclusion of about 1% to about 5% by weight monohydric alcohols in the digestion solvent may desirably maintain catalyst activity due to a surface cleaning effect. Monohydric alcohols present in the digestion solvent may arise from any source. In some embodiments, the monohydric alcohols may be formed via the in situ catalytic reduction reaction process being conducted therein. In some or other embodiments, the monohydric alcohols may be formed during further chemical transformations of the initially formed alcoholic component. In still other embodiments, the monohydric alcohols may be sourced from an external feed that is in flow communication with the cellulosic biomass solids.

In some embodiments, the digestion solvent may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

As described above, one or more liquid phases may be present when digesting cellulosic biomass solids. Particularly when cellulosic biomass solids are fed continuously or semi-continuously to the hydrothermal digestion unit, digestion of the cellulosic biomass solids may produce multiple liquid phases in the hydrothermal digestion unit. The liquid phases may be immiscible with one another, or they may be at least partially miscible with one another. In some embodiments, the one or more liquid phases may comprise a phenolics liquid phase comprising lignin or a product formed therefrom, an aqueous phase comprising the alcoholic component, a light organics phase, or any combination thereof. The alcoholic component being produced from the cellulosic biomass solids may be partitioned between the one or more liquid phases, or the alcoholic component may be located substantially in a single liquid phase. For example, the alcoholic component being produced from the cellulosic biomass solids may be located predominantly in an aqueous phase (e.g., an aqueous phase digestion solvent), although minor amounts of the alcoholic component may be partitioned to the phenolics liquid phase or a light organics phase. In various embodiments, the slurry catalyst may accumulate in the phenolics liquid phase as it forms, thereby complicating distribution of the slurry catalyst in the cellulosic biomass solids using fluid flow in the manner described above. Alternative configurations for distributing slurry catalyst particulates in the cellulosic biomass solids when excessive catalyst accumulation in the phenolics liquid phase has occurred are described hereinafter.

Accumulation of the slurry catalyst in the phenolics liquid phase may, in some embodiments, be addressed by conveying at least a portion of the phenolics liquid phase and the slurry catalyst to a location above at least a portion of the cellulosic biomass solids and releasing them, such that the phenolics liquid phase and the slurry catalyst therein contact the cellulosic biomass solids. For example, in some embodiments, the phenolics liquid phase and the accumulated slurry catalyst may be conveyed external to the hydrothermal digestion unit and then be reintroduced thereto before being released. In such embodiments, at least a portion of the slurry catalyst may become distributed in the cellulosic biomass solids by downward percolation through the cellulosic biomass solids, rather than being upwardly distributed using upwardly directed fluid flow. Suitable techniques for downward percolation of a phenolics liquid phase containing a slurry catalyst through cellulosic biomass solids are described in commonly owned U.S. Patent Application 61/720,757, previously incorporated herein by reference in its entirety. Such techniques for slurry catalyst distribution are compatible with supplying molecular hydrogen at multiple spaced apart vertical locations and may be used in combination therewith. In some embodiments, at least a portion of the lignin in the phenolics liquid phase may be depolymerized before or while conveying the phenolics liquid phase for redistribution of the slurry catalyst. At least partial depolymerization of the lignin in the phenolics liquid phase may reduce the viscosity of this phase and make it easier to convey. Lignin depolymerization may take place chemically by hydrolyzing the lignin (e.g., with a base) or thermally by heating the lignin to a temperature of at least about 250° C. in the presence of molecular hydrogen and the slurry catalyst. Further details regarding lignin depolymerization and the use of viscosity monitoring as a means of process control are described in commonly owned U.S. Patent Application 61/720,765, filed Oct. 31, 2012 and incorporated herein by reference in its entirety. It is to be recognized that slurry catalyst accumulated in other fluid phases may be conveyed and released in a like manner to affect downward percolation of the slurry catalyst through the cellulosic biomass solids.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst that is capable of activating molecular hydrogen may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. patent application Ser. No. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. patent application Ser. No. 12/407,479 (U.S. Patent Application Publication No. 20100236988), filed on Mar. 19, 2009 and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030,915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals.

In some embodiments, the alcoholic component formed from the cellulosic biomass solids may be further reformed into a biofuel. Reforming the alcoholic component into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent reforming reactions may be catalytic or non-catalytic. In some embodiments, an initial operation of downstream reforming may comprise a condensation reaction, often conducted in the presence of a condensation catalyst, in which the alcoholic component or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on the alcoholic component or a product derived therefrom. In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise ≥$C_4$ hydrocarbons. In some or other embodiments, the higher molecular weight compound produced by the condensation reaction may comprise ≥$C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of $\geq C_5$ cycloalkanes and $\geq C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst.

Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

Various operations may optionally be performed on the alcoholic component prior to conducting a condensation reaction. In addition, various operations may optionally be performed on the components of a fluid phase exiting the hydrothermal digestion unit that may further transform the alcoholic component or place the alcoholic component in a form more suitable for taking part in a condensation reaction. These optional operations are now described in more detail below.

After forming the alcoholic component from the cellulosic biomass solids, at least a portion of the alcoholic component may be separated from the cellulosic biomass solids and further processed by performing a condensation reaction on the alcoholic component in the aqueous phase, as described above. Processing of the alcoholic component in the aqueous phase may take place while simultaneously processing the light organics phase, or the light organics phase may be processed separately. The portion of the aqueous phase separated from the cellulosic biomass solids for purposes of processing the alcoholic component may comprise the aqueous phase alone, or a mixture of the aqueous phase with one or more of the other liquid phases present in the hydrothermal digestion unit (e.g., the phenolics liquid phase and/or the light organics phase).

Optionally, the aqueous phase separated from the cellulosic biomass solids may be subjected to a second catalytic reduction reaction, if needed, for example, to increase the amount of soluble carbohydrates that are converted into the alcoholic component and/or to further reduce the degree of oxygenation of the alcoholic components that are formed. For example, in some embodiments, a glycol or more highly oxygenated alcohol may be transformed into a monohydric alcohol by performing a second catalytic reduction reaction. The choice of whether to perform a condensation reaction on a monohydric alcohol or a glycol may be based on a number of factors, as discussed in more detail below, and each approach may present particular advantages.

In some embodiments, a glycol produced from the cellulosic biomass solids may be fed to the condensation catalyst. Although glycols may be prone to coking when used in conjunction with condensation catalysts, particularly zeolite catalysts, the present inventor found the degree of coking to be manageable in the production of higher molecular weight compounds. Approaches for producing glycols from cellulosic biomass solids and feeding the glycols to a condensation catalyst are described in commonly owned U.S. Patent Application 61/720,704, filed Oct. 31, 2012, issued as U.S. Pat. No. 9,353,031, and incorporated herein by reference in its entirety. A primary advantage of feeding glycols to a condensation catalyst is that removal of water from glycols is considerably easier than from monohydric alcohols. Excessive water exposure can be particularly detrimental for zeolite catalysts and shorten their lifetime. Although monohydric alcohols are typically a preferred substrate for zeolite catalysts, they may be difficult to prepare in dried form due to azeotrope formation with water. Glycols, in contrast, are not believed to readily form binary azeotropes with water and may be produced in dried form by distillation.

In some embodiments, a dried alcoholic component, particularly a dried glycol, may be produced from cellulosic biomass solids and fed to a condensation catalyst. As used herein, the term "dried alcoholic component" refers to a liquid phase containing an alcohol that has had a least a portion of the water removed therefrom. Likewise, the terms "dried glycol" and "dried monohydric alcohol" respectively refer to a glycol or a monohydric alcohol that has had at least a portion of the water removed therefrom. It is to be recognized that a dried alcoholic component need not necessarily be completely anhydrous when dried, simply that its water content be reduced (e.g., less than 50 wt. % water). In some embodiments, the dried alcoholic component may comprise about 40 wt. % or less water. In some or other embodiments, the dried alcoholic component may comprise about 35 wt. % or less water, or about 30 wt. % or less water, or about 25 wt. % or less water, or about 20 wt. % or less water, or about 15 wt. % or less water, or about 10 wt. % or less water, or about 5 wt. % or less water. In some embodiments of the methods described herein, a substantially anhydrous alcoholic component may be produced upon drying. As used herein, a substance will be considered to be substantially anhydrous if it contains about 5 wt. % water or less. In other embodiments, it may be more desirable to feed monohydric alcohols to the condensation catalyst due to a lower incidence of coking. As previously described, monohydric alcohols may be more difficult to produce in dried form due to azeotrope formation during distillation. In some embodiments, monohydric alcohols produced from cellulosic biomass solids may be fed directly to a condensation catalyst, without drying. In other embodiments, dried monohydric alcohols may be fed to a condensation catalyst. In some embodiments, dried monohydric alcohols may be produced from dried glycols. Specifically, dried glycols may be produced as described hereinabove, and the dried glycols may then be subjected to a catalytic reduction reaction to produce monohydric alcohols. The monohydric alcohols may contain a comparable amount of water to that present in the dried glycols from which they were formed. Thus, forming dried monohydric alcohols in the foregoing manner may desirably allow a reduced incidence of coking to be realized while maintaining lifetime of the condensation catalyst by providing a dried feed. The foregoing approach for producing dried monohydric alcohols from cellulosic biomass solids is described in commonly owned U.S. Patent Application 61/720,714, filed Oct. 31, 2012, issued as U.S. Pat. No. 9,181,158, and incorporated herein by reference in its entirety.

In some embodiments, a phenolics liquid phase formed from the cellulosic biomass solids may be further processed. Processing of the phenolics liquid phase may facilitate the catalytic reduction reaction being performed to stabilize soluble carbohydrates. In addition, further processing of the phenolics liquid phase may be coupled with the production of dried glycols or dried monohydric alcohols for feeding to a condensation catalyst. Moreover, further processing of the phenolics liquid phase may produce methanol and phenolic compounds from degradation of the lignin present in the cellulosic biomass solids, thereby increasing the overall weight percentage of the cellulosic biomass solids that may be transformed into useful materials. Finally, further processing of the phenolics liquid phase may improve the lifetime of the slurry catalyst.

Various techniques for processing a phenolics liquid phase produced from cellulosic biomass solids are described in commonly owned U.S. Patent Applications 61/720,689, 61/720,747, and 61/720,774, each filed on Oct. 31, 2012, and issued as U.S. Pat. No. 9,284,242, published as US20140117277, and issued as U.S. Pat. No. 9,376,355, respectively, and each incorporated herein by reference in its entirety. As described therein, in some embodiments, the viscosity of the phenolics liquid phase may be reduced in order to facilitate conveyance or handling of the phenolics liquid phase. As further described therein, deviscosification of the phenolics liquid phase may take place by chemically hydrolyzing the lignin and/or heating the phenolics liquid phase in the presence of molecular hydrogen (i.e., hydrotreating) to depolymerize at least a portion of the lignin present therein in the presence of accumulated slurry catalyst. Deviscosification of the phenolics liquid phase may take place before or after separation of the phenolics liquid phase from one or more of the other liquid phases present, and thermal deviscosification may be coupled to the reaction or series of reactions used to produce the alcoholic component from the cellulosic biomass solids. Moreover, after deviscosification of the phenolics liquid phase, the slurry catalyst may be removed therefrom. The catalyst may then be regenerated, returned to the cellulosic biomass solids, or any combination thereof.

In some embodiments, heating of the cellulosic biomass solids and the digestion solvent to form soluble carbohydrates and a phenolics liquid phase may take place while the cellulosic biomass solids are in a pressurized state. As used herein, the term "pressurized state" refers to a pressure that is greater than atmospheric pressure (1 bar). Heating a digestion solvent in a pressurized state may allow the normal boiling point of the digestion solvent to be exceeded, thereby allowing the rate of hydrothermal digestion to be increased relative to lower temperature digestion processes. In some embodiments, heating the cellulosic biomass solids and the digestion solvent may take place at a pressure of at least about 30 bar. In some embodiments, heating the cellulosic biomass solids and the digestion solvent may take place at a pressure of at least about 60 bar, or at a pressure of at least about 90 bar. In some embodiments, heating the cellulosic biomass solids and the digestion solvent may take place at a pressure ranging between about 30 bar and about 430 bar. In some embodiments, heating the cellulosic biomass solids and the digestion solvent may take place at a pressure ranging between about 50 bar and about 330 bar, or at a pressure ranging between about 70 bar and about 130 bar, or at a pressure ranging between about 30 bar and about 130 bar.

In some embodiments, systems configured for processing cellulosic biomass solids are described herein. The methods described hereinabove may be practiced with the illustrative biomass conversion systems described hereinafter. In various embodiments, the illustrative biomass conversion systems may be configured to introduce a gas (e.g., molecular hydrogen) to the hydrothermal digestion unit via a plurality of spaced apart fluid inlets vertically disposed about the height of the hydrothermal digestion unit. The spaced apart fluid inlets may deliver molecular hydrogen or a fluid phase containing molecular hydrogen to cellulosic biomass solids contained therein, such that small molecular hydrogen bubble sizes are maintained for distribution within the cellulosic biomass solids.

In some embodiments, biomass conversion systems described herein can comprise: a hydrothermal digestion unit; a plurality of spaced apart fluid inlets vertically disposed about the height of the hydrothermal digestion unit; and a gas recirculation line configured to remove a gas from the hydrothermal digestion unit and return at least a portion of the gas to the hydrothermal digestion unit via the plurality of spaced apart fluid inlets, wherein the gas recirculation line is fluidly connected to the plurality of spaced apart fluid inlets.

In some embodiments, the gas recirculation line may be fluidly connected to the hydrothermal digestion unit at a location above an uppermost of the spaced apart fluid inlets. For example, in some embodiments, the gas recirculation line may be fluidly connected to the hydrothermal digestion unit at a gas headspace of the hydrothermal digestion unit, such that excess molecular hydrogen or another gas can be removed therefrom and recirculated to the hydrothermal digestion unit. In some embodiments, the gas recirculation line may be fluidly connected to the top of the hydrothermal digestion unit. In other embodiments, the gas recirculation line may be fluidly connected to the side of the hydrothermal digestion unit at a location above an uppermost of the spaced apart fluid inlets.

In some embodiments, the biomass conversion systems may further comprise a fluid inlet disposed on the bottom surface of the hydrothermal digestion unit. Gas flow from this fluid inlet may supplement that introduced to the hydrothermal digestion unit via the plurality of spaced apart fluid inlets. In some embodiments, the gas recirculation line may be further configured to remove at least a portion of the gas from the hydrothermal digestion unit and return at least a portion of the gas to the fluid inlet disposed on the bottom surface of the hydrothermal digestion unit. That is, in some embodiments, the gas recirculation line may be fluidly connected to the fluid inlet disposed on the bottom surface of the hydrothermal digestion unit, in addition to being fluidly connected to the plurality of spaced apart fluid inlets disposed about the height of the hydrothermal digestion unit.

In addition to recirculation of a gas within the hydrothermal digestion unit, the biomass conversion systems may be further configured to recirculate a liquid phase within the hydrothermal digestion unit. In some embodiments, the liquid phase may contain a mixture of a liquid (e.g., a digestion solvent) and a gas (e.g., molecular hydrogen). In other embodiments, the liquid phase may be substantially devoid of molecular hydrogen. In some embodiments, the biomass conversion systems described herein may further comprise a fluid recirculation line configured to remove a mixture of a gas and a liquid from the hydrothermal digestion unit and return at least a portion of the gas to the hydrothermal digestion unit. In some embodiments, the fluid recirculation line may be configured to return the gas to the hydrothermal digestion unit via the plurality of spaced apart fluid inlets that are fluidly connected to the gas recirculation line. In other embodiments, the fluid recirculation line may be configured to return the gas to the hydrothermal digestion unit via spaced apart fluid inlets that are not fluidly connected to the gas recirculation line. That is, in some embodiments, the fluid recirculation line may be fluidly connected to a second plurality of spaced apart fluid inlets disposed about the height of the hydrothermal digestion unit, where the second plurality of fluid inlets are not fluidly connected to the gas recirculation line. In some embodiments, the fluid recirculation line may be configured to separate a gas from a liquid before returning the gas to the hydrothermal digestion unit. In such embodiments, a gas-liquid separation mechanism may be in fluid communication with the fluid recirculation line before it reconnects with the hydrothermal digestion unit. Moreover, in such embodiments, the fluid recirculation line may branch before reconnecting with the hydrothermal digestion unit such that the gas and the liquid may be reintroduced separately to the hydrothermal digestion unit.

In some embodiments, the gas recirculation line may be fluidly connected to the hydrothermal digestion unit at a location above an uppermost of the spaced apart fluid inlets. In some or other embodiments, the fluid recirculation line may be fluidly connected to the hydrothermal digestion unit at a location above an uppermost of the spaced apart fluid inlets. In some or other embodiments, the fluid recirculation line may be fluidly connected to the hydrothermal digestion unit at multiple spaced apart locations vertically disposed about the height of the hydrothermal digestion unit.

In some embodiments, the spaced apart fluid inlets used for introducing a gas phase and/or a liquid phase to the hydrothermal digestion unit may be operably connected to a flow dispersal system located within the hydrothermal digestion unit. Suitable flow dispersal systems have been described in more detail hereinabove.

In some embodiments, the biomass conversion systems may further comprise a porous retention structure within the hydrothermal digestion unit. Suitable porous retention structures may include, for example, screens, grids, porous media, and the like. Benefits of including a porous retention structure within the hydrothermal digestion unit may include, for example, limiting access of the cellulosic biomass solids to the bottom of the hydrothermal digestion unit and thereby promoting fluid flow within the hydrothermal digestion unit. In some embodiments, the porous retention structure may be further configured to allow at least some cellulosic biomass solids to pass therethrough. For example, in some embodiments, the porous retention structure may be further configured to allow cellulosic biomass solids to be extruded therethrough as they are partially digested. In some embodiments, the biomass conversion systems may further comprise a transfer line fluidly coupled to the hydrothermal digestion unit and configured to remove a fluid from a lower portion of the hydrothermal digestion unit and return the fluid to an upper portion of the hydrothermal digestion unit. For example, in some embodiments, the transfer line may be configured to convey a phenolics liquid phase from the bottom of the hydrothermal digestion unit to a location in an upper portion of the hydrothermal digestion unit, so as to redistribute slurry catalyst accumulated in the phenolics liquid phase into the cellulosic biomass solids.

In some embodiments, the hydrothermal digestion unit may be configured such that cellulosic biomass solids can be continuously or semi-continuously fed thereto, thereby allowing hydrothermal digestion to take place in a continual manner. That is, the hydrothermal digestion unit of the biomass conversion systems may be configured such that fresh cellulosic biomass solids may be added to the hydrothermal digestion unit on an ongoing basis or an as-needed basis in order to replenish cellulosic biomass solids that have been digested to form soluble carbohydrates. Specifically, the biomass conversion systems may further comprise a solids introduction mechanism coupled to the top of the hydrothermal digestion unit. Some suitable solids introduction mechanisms are described hereinafter. In some embodiments, the cellulosic biomass solids may be continuously or semi-continuously added to the hydrothermal digestion unit while the hydrothermal digestion unit is in a pressurized state. In some embodiments, the pressurized state may comprise a pressure of at least about 30 bar. Without the ability to introduce fresh cellulosic biomass solids to a pressurized hydrothermal digestion unit, depressurization and cooling of the hydrothermal digestion unit may take place during biomass addition, significantly reducing the energy- and cost-efficiency of the biomass conversion process. As used herein, the term "continuous addition" and grammatical equivalents thereof will refer to a process in which cellulosic biomass solids are added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of cellulosic biomass solids to a hydrothermal digestion unit without fully depressurizing the hydrothermal digestion unit. Techniques through which cellulosic biomass solids may be added continuously or semi-continuously to a pressurized hydrothermal digestion unit are discussed in more detail hereinbelow.

In some embodiments, cellulosic biomass solids being continuously or semi-continuously added to the hydrothermal digestion unit may be pressurized before being added to the hydrothermal digestion unit, particularly when the hydrothermal digestion unit is in a pressurized state. Pressurization of the cellulosic biomass solids from atmospheric pressure to a pressurized state may take place in one or more pressurization zones before addition of the cellulosic biomass solids to the hydrothermal digestion unit. Suitable pressurization zones that may be used for pressurizing and introducing cellulosic biomass solids to a pressurized hydrothermal digestion unit are described in more detail in commonly owned U.S. patent application Ser. No. 13/332,322; and, application Ser. No. 13/332,329, each filed on Dec. 20, 2011, issued as U.S. Pat. No. 8,945,329 and U.S. Pat. No. 9,175,277, respectively, and incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner.

In some embodiments, the biomass conversion systems may further comprise a reactor housing a condensation catalyst, the reactor being in fluid communication with the hydrothermal digestion unit. In some embodiments, the reactor housing a condensation catalyst may be fluidly connected to a liquids removal line. The liquids removal line may be used to remove a liquid phase and, optionally, an admixed gas phase from the hydrothermal digestion unit. The liquids removal line may be configured to convey the liquid and/or gas to the reactor and/or return at least a portion of the liquid phase to the hydrothermal digestion unit as an upwardly directed fluid flow. Moreover, in some embodiments, the liquids removal line may also be fluidly connected to the fluid recirculation line that is configured for returning molecular hydrogen to the hydrothermal digestion unit via the plurality of spaced apart fluid inlets vertically disposed about the height of the hydrothermal digestion unit.

In other various embodiments, biomass conversion systems described herein may comprise a hydrothermal digestion unit, a plurality of spaced apart fluid inlets vertically disposed about the height of the hydrothermal digestion unit, and a fluid recirculation line configured to remove a mixture of a liquid and a gas from the hydrothermal digestion unit and return at least a portion of the gas to the hydrothermal digestion unit via the plurality of spaced apart fluid inlets, where the fluid recirculation line is fluidly connected to the plurality of spaced apart fluid inlets.

In some embodiments, the biomass conversion systems may further comprise a fluid inlet disposed on the bottom surface of the hydrothermal digestion unit. In some embodiments, the fluid recirculation line may also be fluidly connected to the fluid inlet disposed on the bottom surface of the hydrothermal digestion unit. In some embodiments, the biomass conversion systems may further comprise a gas recirculation line configured to remove a gas from the hydrothermal digestion unit and return at least a portion of the gas to the hydrothermal digestion unit via the fluid inlet disposed on the bottom surface of the hydrothermal digestion unit. In various embodiments, the gas recirculation line may also be fluidly connected to the hydrothermal digestion unit at multiple spaced apart locations vertically disposed about the height of the hydrothermal digestion unit.

In some embodiments, the fluid recirculation line and the spaced apart fluid inlets may be configured to return the gas and the liquid to the hydrothermal digestion unit as a mixture. In other embodiments, the fluid recirculation line and the spaced apart fluid inlets may be configured to separate the gas from the liquid and individually return them to the hydrothermal digestion unit.

The methods and biomass conversion systems described herein will now be described with further reference to the drawings. When like elements are used in one or more figures, identical reference characters will be used in each figure, and a detailed description of the element will be provided only at its first occurrence. Some features of the biomass conversion systems may be omitted in certain depicted configurations in the interest of clarity. Moreover, certain features such as, but not limited to pumps, valves, and the like have not been depicted in the figures. In the figures, arrows have been drawn to depict the direction of liquid or gas flow. Moreover, in the figures, fluid transfer lines configured for conveying only a gas have been depicted with single lines, and fluid transfer lines configured for conveying a gas, a liquid, or a combination thereof have been depicted as conduits having two sides.

FIGS. 1-7 show schematics of illustrative biomass conversion systems 1-7 in which cellulosic biomass solids may be digested in the presence of a digestion solvent to produce an alcoholic component. In general, the biomass conversion systems depicted in FIGS. 1-7 include hydrothermal digestion unit 10, which may be configured such that molecular hydrogen can be introduced thereto at multiple locations, as discussed in greater detail hereinafter for each depicted configuration. Solids introduction mechanism 12 may be operatively coupled to hydrothermal digestion unit 10. Solids introduction mechanism 12 may comprise loading mechanism 14 and pressure transition zone 16, which may elevate the cellulosic biomass solids from atmospheric pressure to a pressure near that of the operating pressure of hydrothermal digestion unit 10, thereby allowing continuous or semi-continuous introduction of cellulosic biomass solids to take place without fully depressurizing hydrothermal digestion unit 10. Suitable loading mechanisms and pressure transition zones have been described in more detail hereinabove.

The biomass conversion systems may optionally include polishing reactor 20 that is fluidly coupled to hydrothermal digestion unit 10 via line 22. Polishing reactor 20 may contain a catalyst capable of activating molecular hydrogen, such that soluble carbohydrates being conveyed from hydrothermal digestion unit 10 may be further converted into an alcoholic component or the degree of oxygenation of the alcoholic component may be further decreased. For example, in some embodiments, a glycol may be converted into a monohydric alcohol in polishing reactor 20. The catalyst present in polishing reactor 20 may be the same as or different than the slurry catalyst present in hydrothermal digestion unit 10. Thereafter, the alcoholic component may be conveyed to separations unit 24, where various operations may take place. In some embodiments, at least a portion of any water present in the alcoholic component may be removed in separations unit 24 before subsequent downstream processing takes place. In some embodiments, a phenolics liquid phase may be separated from the alcoholic component in separations unit 24 before further processing takes place, or the viscosity of the phenolics liquid phase may be reduced, as described above. In some embodiments, a portion of the alcoholic component may be separated from the remainder of the liquid phase being processed in separations unit 24. Optionally, at least a portion of the separated alcoholic component may be recirculated to hydrothermal digestion unit 10 via recycle line 26, if desired. Likewise, the alcoholic component may be recirculated to hydrothermal digestion unit 10, before separation takes place, via recycle line 28. The recirculated alcoholic component may be returned to hydrothermal digestion unit 10 such that it provides upwardly directed fluid flow therein.

The alcoholic component exiting separations unit 24 may be conveyed to reforming reactor 30 via line 32. In reforming reactor 30, a condensation reaction or other reforming reaction may take place. The reforming reaction taking place therein may be catalytic or non-catalytic. Although only one reforming reactor 30 has been depicted in the figures, it is to be understood that any number of reforming reactors may be present. In reforming reactor 30, one or more further reforming reactions may take place, as described above. In some embodiments, a first reforming reaction may comprise a condensation reaction. Additional reforming reactions may comprise any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such transformations may be used to convert the initially produced soluble carbohydrates into a biofuel. Such biofuels may include, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of 32° C. to about 204° C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point ranging between about 187° C. and about 417° C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655. In some embodiments, jet fuels may comprise a kerosene-type fuel having substantially $C_8$-$C_{16}$ hydrocarbons (Jet A and Jet A-1 fuels). In other embodiments, jet fuels may comprise a wide-cut or naphtha-type fuel having substantially $C_5$-$C_{15}$ hydrocarbons present therein (Jet B fuels).

As described above, recirculation flow from recycle lines 26 and 28 may be configured to provide upwardly directed fluid flow in hydrothermal digestion unit 10. Upwardly directed fluid flow may also be provided from fluid inlet 34. Fluid inlet 34 may provide a liquid flow, a gas flow, or any combination thereof. As depicted in some of the figures, fluid inlet 34 may be configured such that it can deliver recirculated molecular hydrogen to hydrothermal digestion unit 10. Upwardly directed fluid flow supplied by the liquid and/or gas may promote distribution of a slurry catalyst within cellulosic biomass solids undergoing digestion in the hydrothermal digestion unit.

In addition to distribution of the slurry catalyst taking place via upwardly directed fluid flow, in certain embodiments, fluid conduit 36 may be configured so as to transport a fluid from a lower portion of hydrothermal digestion unit 10 to an upper portion. For example, fluid conduit 36 may be configured to transport a phenolics liquid phase and slurry catalyst accumulated therein to an upper portion of hydrothermal digestion unit 10, such that the slurry catalyst can become distributed in the cellulosic biomass solids from above. In certain embodiments, fluid conduit 36 may be operatively connected to flow dispersal system 38 within hydrothermal digestion unit 10 such that the phenolics liquid phase is effectively spread over the digesting cellulosic biomass solids. It should be pointed out that fluid conduit 36 and flow dispersal system 38 have not been depicted in all of the figures in the interest of clarity, but it is to be recognized that they may be present in any of the various configurations depicted herein.

The various configurations through which molecular hydrogen may be introduced at multiple locations to hydrothermal digestion unit 10 will now be described in greater detail. Referring now to FIG. 1, gas recirculation line 100 may remove gaseous molecular hydrogen from hydrothermal digestion unit 10 and return it thereto via fluid inlets 102, which are vertically spaced apart about the height of hydrothermal digestion unit 10. Although only five fluid inlets 102 have been depicted in FIG. 1, it is to be recognized that any number needed to produce a desired degree of molecular hydrogen distribution may be present. Moreover, the spacing between fluid inlets 102 may be regular or irregular. Furthermore, it is to be recognized that gas recirculation line 100 may withdraw gaseous molecular hydrogen from hydrothermal digestion unit 10 at more than one location, if desired. Fluid inlets 102 may be operatively connected to a flow dispersal system in hydrothermal digestion unit 10, if desired (not shown). Molecular hydrogen being introduced to hydrothermal digestion unit 10 from fluid inlets 100 may be introduced as bubbles within the digestion solvent so that the molecular hydrogen may become distributed in cellulosic biomass solids contained in hydrothermal digestion unit 10. As depicted in FIG. 1, gas recirculation line 100 may also be fluidly coupled to fluid inlet 34 in order to supply at least a portion of the upwardly directed fluid flow in hydrothermal digestion unit 10.

Figure 2:
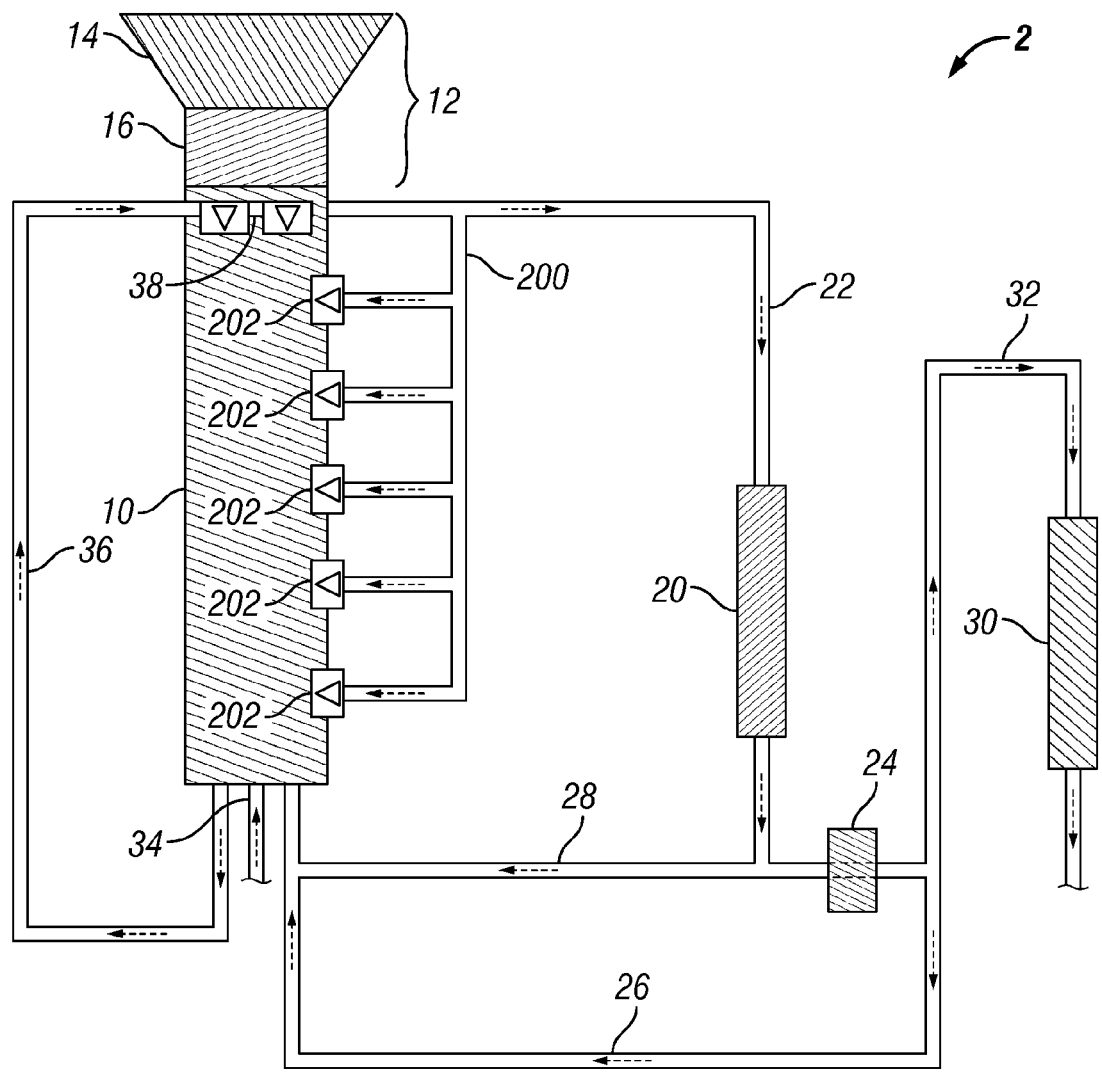

Referring now to FIG. 2, liquid recirculation line 200 may be configured to withdraw a mixture of digestion solvent and molecular hydrogen from hydrothermal digestion unit 10 and return it thereto via fluid inlets 202. Liquid recirculation line 200 may withdraw the mixture from line 22, as depicted, or it may withdraw the mixture directly from hydrothermal digestion unit 10. Optionally, separation of molecular hydrogen from the digestion solvent may take place before return thereof to hydrothermal digestion unit 10. When the digestion solvent and the molecular hydrogen are separated from one another, some of fluid inlets 202 may return molecular hydrogen and some may return the digestion solvent to hydrothermal digestion unit 10. When the digestion solvent and the molecular hydrogen are not separated from one another, they may each return the mixture. As depicted in FIG. 2, fluid inlets 202 only return molecular hydrogen, the digestion solvent, or a mixture thereof to hydrothermal digestion unit 10, but no fluid withdrawal takes place therefrom.

Figure 3:
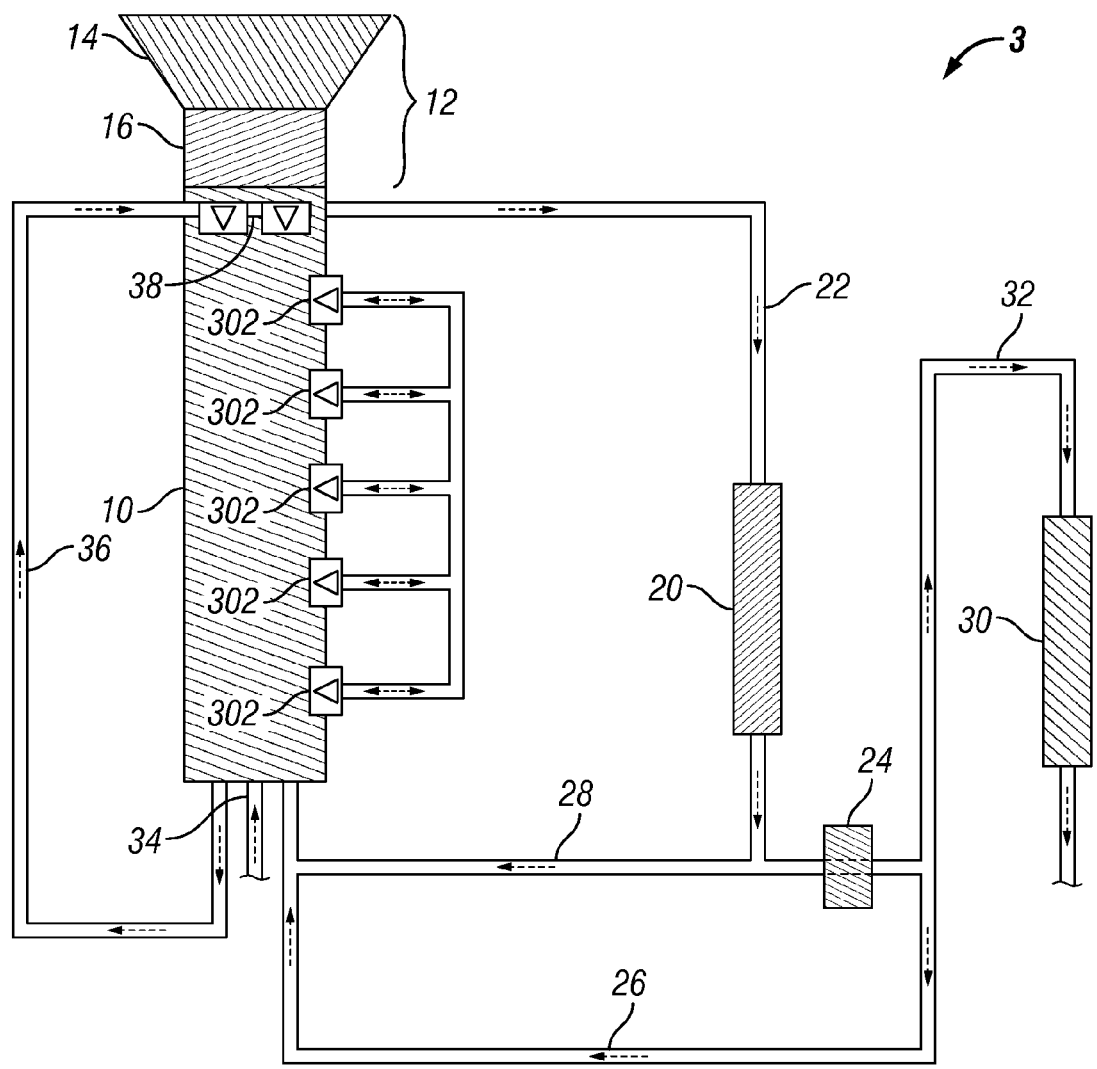

An alternative configuration is depicted in FIG. 3, in which withdrawal of a mixture of digestion solvent and molecular hydrogen may take place from one or more of fluid inlets 303, with return thereof taking place thereafter via fluid inlets 303 not being utilized for withdrawal. Again, if separation of molecular hydrogen and the digestion solvent takes place, they may be returned to hydrothermal digestion unit 10 via different fluid inlets 303. The embodiment depicted in FIG. 3 is similar to that of FIG. 2, with the exception that fluid inlets 303 may be configured for both introduction and withdrawal of a fluid mixture.

Figure 4:
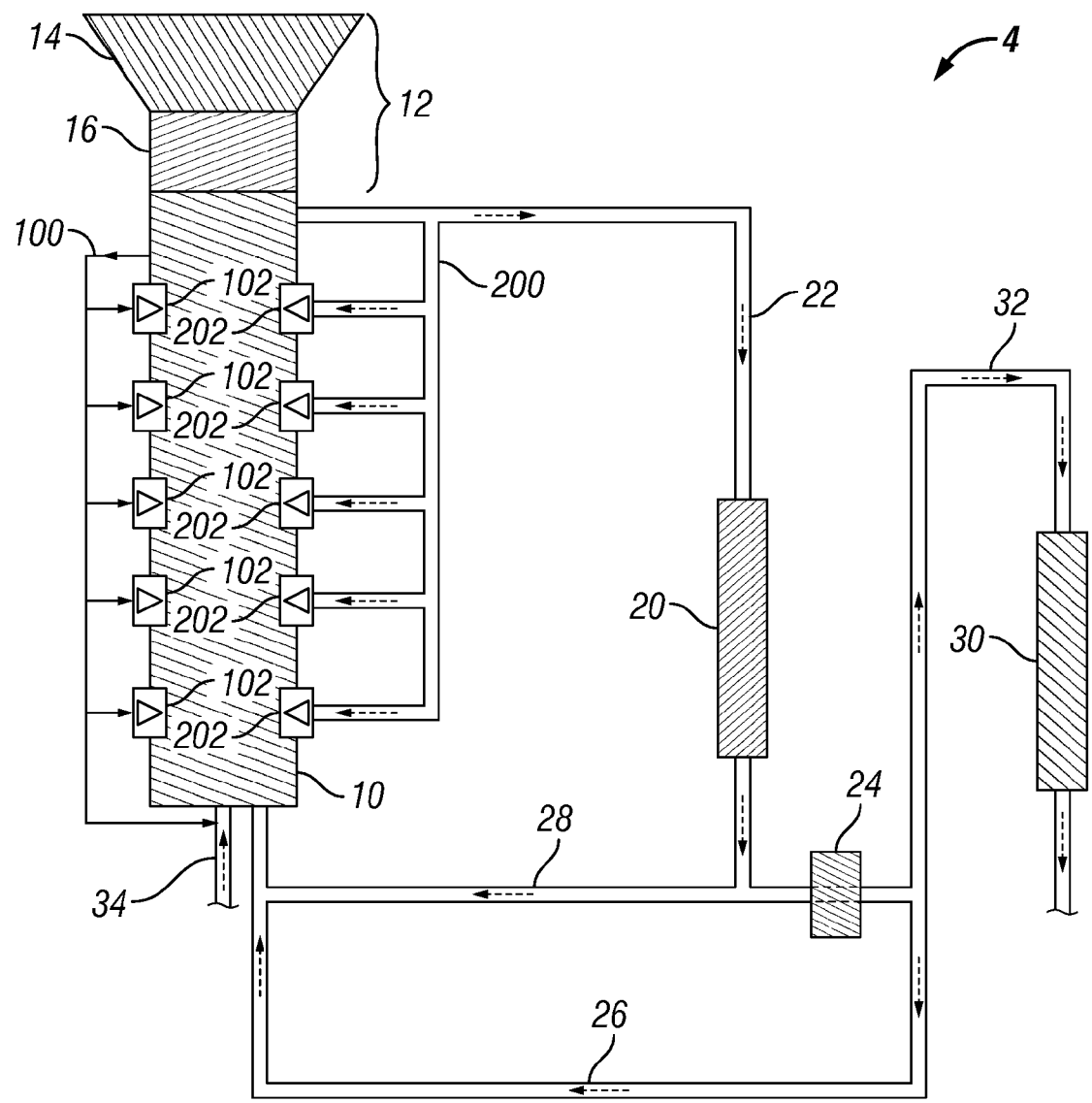
Figure 5:
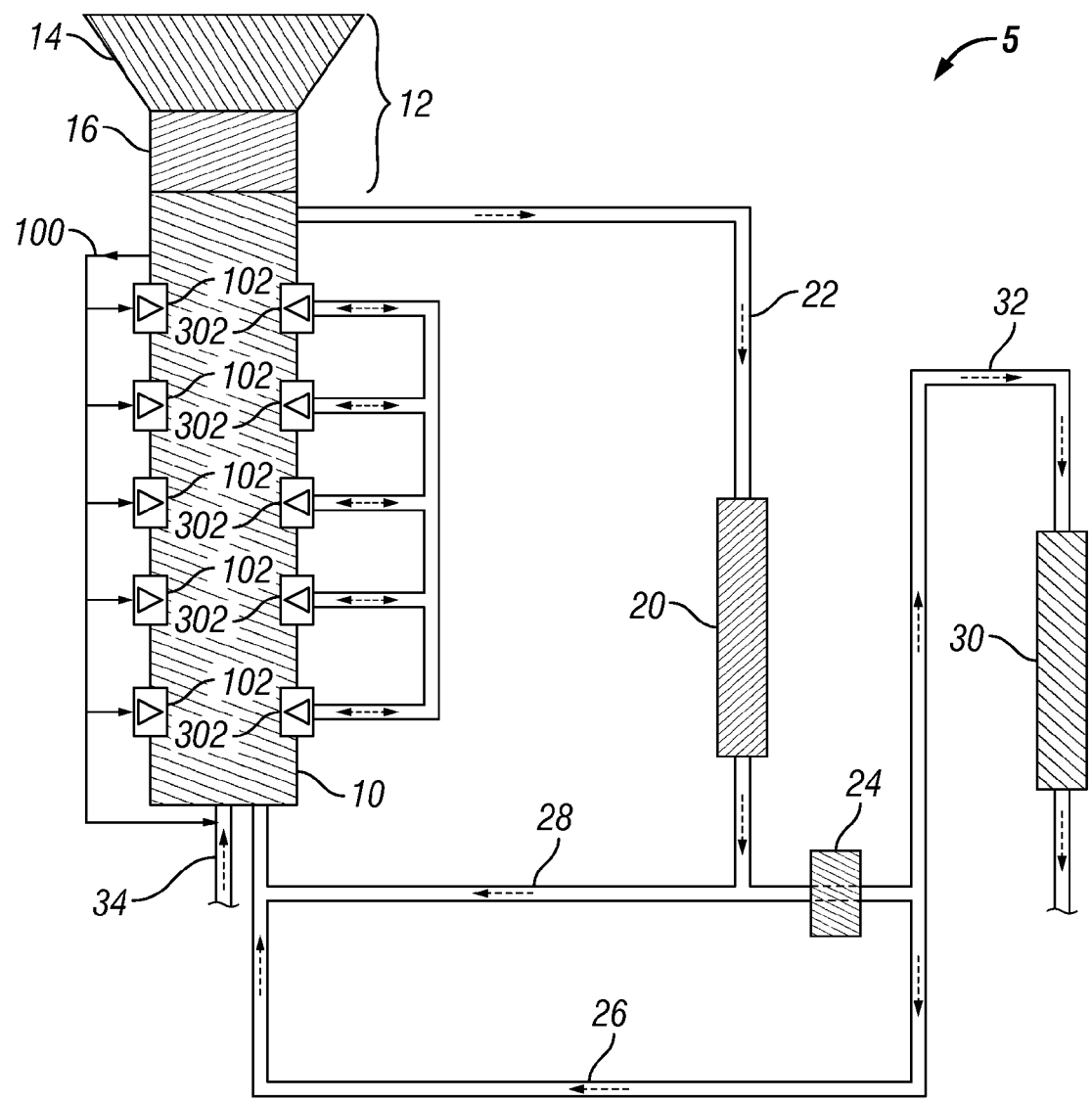

As depicted in FIGS. 4 and 5, the biomass conversion systems may also be configured to return molecular hydrogen to hydrothermal digestion unit 10 from two different sources. As depicted in FIG. 4, gaseous molecular hydrogen and molecular hydrogen obtained from an admixture with the digestion solvent may be returned to hydrothermal digestion unit 10 by combining the embodiments depicted in FIGS. 1 and 2. Likewise, in FIG. 5, the embodiments depicted in FIGS. 1 and 3 may be combined to obtain a similar result. As depicted in FIGS. 4 and 5, molecular hydrogen being recirculated to hydrothermal digestion unit 10 from two different sources may be returned thereto by separate fluid inlets (i.e., fluid inlets 102 and 202 in FIG. 4, and fluid inlets 102 and 302 in FIG. 5). However, as described in more detail above, the molecular hydrogen being recirculated to hydrothermal digestion unit 10 may also be returned via the same fluid inlets. Such configurations are depicted in FIGS. 6 and 7.

Figure 6:
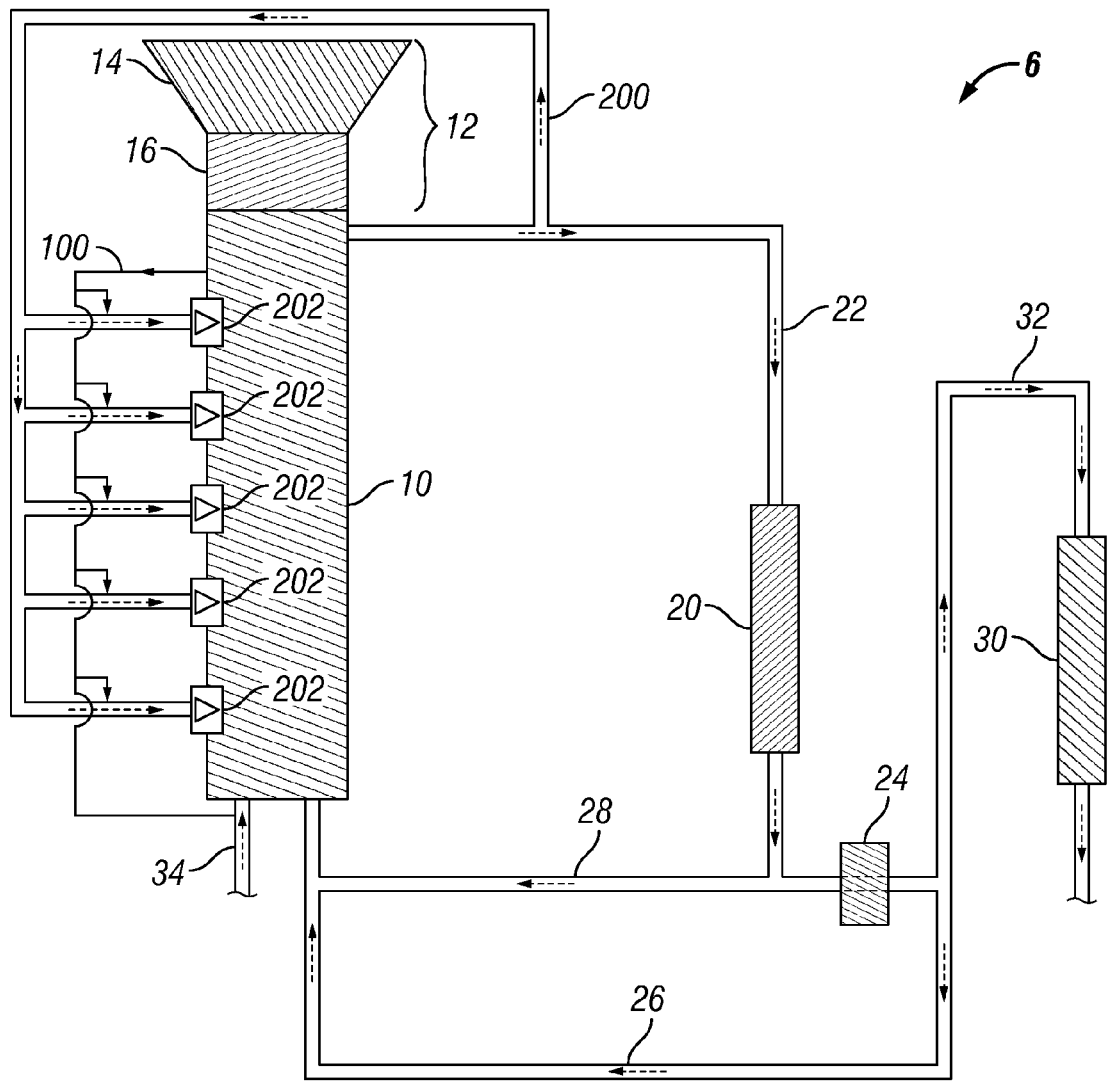
Figure 7:
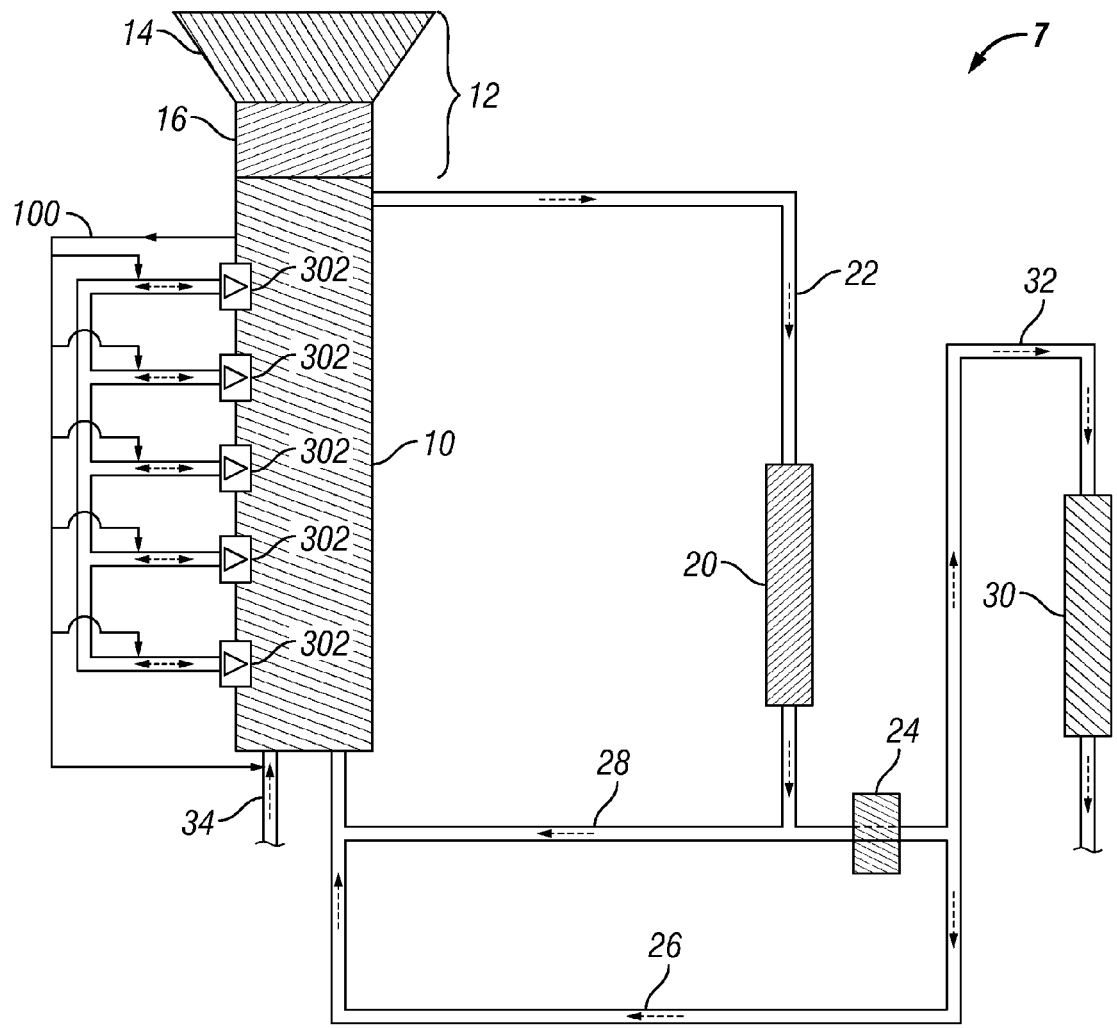

As depicted in FIG. 6, a mixture of digestion solvent and molecular hydrogen may be removed from hydrothermal digestion unit 10 via liquid recirculation line 200 and returned thereto via fluid inlets 202. Concurrently, gaseous molecular hydrogen may be removed from hydrothermal digestion unit 10 via gas recirculation line 100. The molecular hydrogen removed via gas recirculation line 100 may be returned to hydrothermal digestion unit 10 by the same portion of fluid inlets 202 being used to return the molecular hydrogen in admixture with the digestion solvent. Likewise, in FIG. 7, gaseous molecular hydrogen removed from hydrothermal digestion unit 10 via gas recirculation line 100 may be returned to hydrothermal digestion unit 10 via fluid inlets 302, where a portion of fluid inlets 302 are being used to withdraw a mixture of digestion solvent and molecular hydrogen from hydrothermal digestion unit 10 and a portion of fluid inlets 302 are being used to return the admixture to hydrothermal digestion unit 10.

To facilitate a better understanding of the present invention, the following examples of preferred embodiments are given. In no way should the following examples be read to limit, or to define, the scope of the invention.

EXAMPLES

In the Examples that follow, gas chromatography was conducted using a 60 m×0.32 mm ID DB-5 column of 1 µm thickness, with 50:1 split ratio, 2 mL/min helium flow, and column oven held at 40° C. for 8 minutes, followed by ramp to 285° C. at 10° C./min, and a hold time of 53.5 minutes. The injector temperature was set at 250° C., and the detector temperature was set at 300° C. A range of alkanes, monooxygenated aldehyde and ketones, glycols, and polyols were observed in the aqueous phase, each with a volatility greater than the $C_6$ sugar alcohol sorbitol.

Examples 1 and 2

Hydrothermal Digestion of Cellulosic Biomass Solids at Varying Hydrogen Pressures Two 75 mL Parr5000 reactors were charged with 20 grams of deionized water solvent, 0.12 grams of potassium carbonate buffer, and 0.6 grams of slurry catalyst. The slurry catalyst was a sulfided nickel oxide promoted cobalt molybdate catalyst (DC-2534, Criterion Catalyst & Technologies L.P., containing 1-10% cobalt oxide and molybdenum trioxide (up to 30 wt %) on alumina, and less than 2% nickel), which was previously sulfided as described in United States Patent Application Publication 2010/0236988, incorporated herein by reference in its entirety. Each reactor was charged with 2.7 grams of southern pine mini-chips (39% moisture) having nominal dimensions of 3 mm×4 mm×5 mm. For Example 1, the reactor was pressurized with 52 bar of hydrogen while stirring with a stir bar, whereas in Example 2 the reactor was only pressurized with 5 bar of hydrogen. In both Examples, the reactor was heated to 190° C. for 1 hour, followed by heating to 250° C. for 4.5 hours and then to 270° C. for 2 hours.

Following the completion of a first reaction cycle, the reactors were cooled, depressurized, and then charged with 2.7 grams of fresh mini-chips. Thereafter, each reactor was pressurized to the same pressure with hydrogen gas as before. A second digestion cycle was then conducted as above. At the completion of the two cycles, virtually all of the wood chips had been digested. The liquid reactor contents were then analyzed using gas chromatography under the conditions described above. For Example 1, the measured yield was 48% of the theoretical amount, based on the amount of carbohydrates present in the wood charge. For Example 2, the measured yield was only 8% of the theoretical amount. In Example 2, subsequent GC-MS analysis indicated the presence of higher molecular weight polymers that accounted for the remaining yield. Thus, in the presence of inadequate amounts of molecular hydrogen, yields were reduced.

Example 3

In Situ Formation of a Mono-Oxygenated Solvent

A 100 mL Parr reactor was charged with 60 grams of 35% ethanol in deionized water solvent, 0.19 grams of potassium carbonate buffer, and 1.8 grams of the sulfided cobalt molybdate catalyst described above. 6 grams of ground softwood (pine) were then added to the reactor, which was then pressurized with 55 bar of hydrogen. The reactor was then heated at 190° C. for 1 hour, followed by heating at 250° C. for 4 hours. Thereafter, the reactor was cooled, and 6 grams of liquid product were removed by a 0.5 micron filtered dip tube. The reactor was then repressurized as above, and 8 subsequent cycles of heating and liquid product withdrawal were conducted. The final liquid product contained $C_3$-$C_6$ mono-oxygenated hydrocarbons and $C_2$-$C_3$ glycols. Residual ethanol and water were also present.

Examples 4 and 5

Bubble Coalescence Measurements

For Example 4, a 25 mm i.d.×600 mm glass chromatography column was fitted with a 0.25 inch diameter bottom fitting, which was connected to an in-line 0.25 inch diameter 0.5 micron sintered metal filter. The sintered metal filter was located 1.5 inches below the bottom inlet to the column. The column was then filled to the 450 mm mark with deionized water and nitrogen gas flow was introduced at 300 mL/min. Measurement of the gas bubble size was conducted by photographing the column during gas addition and then analyzing the bubble size in the photographs thereafter. While approximately 90% of the observed gas bubbles remained at 3 mm or smaller in diameter, some coalescence to gas bubbles spanning the 25 mm column diameter was observed over the liquid level in the column. These larger bubbles were estimated to comprise about 60% of the total gas holdup in the column.

For Example 5, the experiment of Example 4 was repeated in the presence of wood mini-chips having nominal dimensions of 3 mm×4 mm×5 mm. The 0.5 micron filter element was fitted onto ⅛ inch tubing and extended up into the column Nitrogen gas was introduced as described above. In addition, the reaction product of Example 3 was fed to the column. In this case, there was no coalescence to gas bubbles that spanned the 25 mm column diameter. However, entrapment of the gas bubbles in the wood matrix was observed, resulting in progressive coalescence of the gas bubbles from the bottom to the top of the column Thus, Example 5 shows that gas bubble coalescence can occur over short distances in the presence of cellulosic biomass solids, even in the presence of an alcoholic co-solvent that can reduce surface tension and stabilize smaller gas bubbles. Given the propensity for gas bubble coalescence to occur and the desirability of maintaining high levels of molecular hydrogen in contact with the cellulosic biomass solids (see Example 1 and 2), introduction of molecular hydrogen to cellulosic biomass solids at multiple vertical locations may be particularly suitable.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing cellulosic biomass solids in a hydrothermal digestion unit in the presence of a digestion solvent and a slurry catalyst capable of activating molecular hydrogen; and
heating the cellulosic biomass solids and the digestion solvent in the presence of molecular hydrogen, thereby forming an alcoholic component derived from the cellulosic biomass solids, wherein at least a portion of the molecular hydrogen being introduced to the hydrothermal digestion unit via a plurality of spaced apart fluid inlets vertically disposed along the height of the hydrothermal digestion unit and
wherein the molecular hydrogen is distributed as bubbles in the cellulosic biomass solids, the bubbles being about 3 mm or less in size when introduced to the hydrothermal digestion unit from a first spaced apart fluid inlet and reaching a maximum size of about 20 mm as the bubbles rise in the cellulosic biomass solids.

2. The method of claim 1, wherein the molecular hydrogen is continuously introduced to the hydrothermal digestion unit via the plurality of spaced apart fluid inlets while heating takes place.

3. The method of claim 1, wherein at least a portion of the molecular hydrogen is introduced to the hydrothermal digestion unit via a fluid inlet disposed on a bottom surface of the hydrothermal digestion unit.

4. The method of claim 3, further comprising:
removing at least a portion of the molecular hydrogen from the hydrothermal digestion unit; and
returning the molecular hydrogen to the hydrothermal digestion unit, the molecular hydrogen being returned to the hydrothermal digestion unit via the fluid inlet disposed on a bottom surface of the hydrothermal digestion unit.

5. The method of claim 1, further comprising:
supplying upwardly directed fluid flow from a fluid inlet disposed on a bottom surface of the hydrothermal digestion unit, the upwardly directed fluid flow comprising a gas flow, a liquid flow, or any combination thereof.

6. The method of claim 5, wherein before the bubbles reach a second spaced apart fluid inlet located above the first spaced apart fluid inlet, additional molecular hydrogen is introduced to the hydrothermal digestion unit from the second spaced apart fluid inlet.

7. The method of claim 1, wherein the molecular hydrogen is distributed in the cellulosic biomass solids once introduced from the plurality of spaced apart fluid inlets.

8. The method of claim 1, wherein at least a portion of the molecular hydrogen being introduced to the hydrothermal digestion unit via the plurality of spaced apart fluid inlets comprises recirculated molecular hydrogen.

9. The method of claim 8, further comprising:
removing molecular hydrogen from the hydrothermal digestion unit at a location above an uppermost of the spaced apart fluid inlets; and
returning the molecular hydrogen to the hydrothermal digestion unit via the plurality of spaced apart fluid inlets.

10. The method of claim 9, further comprising:
removing at least a portion of the digestion solvent and the molecular hydrogen from the hydrothermal digestion unit, the digestion solvent and the molecular hydrogen being removed from the hydrothermal digestion unit as a mixture; and
returning the digestion solvent and the molecular hydrogen to the hydrothermal digestion unit, the molecular hydrogen from the mixture being returned to the hydrothermal digestion unit via a plurality of spaced apart locations vertically disposed about the height of the hydrothermal digestion unit.

\* \* \* \* \*